United States Patent
Drysch et al.

(10) Patent No.: US 11,802,959 B2
(45) Date of Patent: Oct. 31, 2023

(54) VEHICLE DRIVER BEHAVIOR DATA COLLECTION AND REPORTING

(71) Applicant: PreAct Technologies, Inc., Herndon, VA (US)

(72) Inventors: Paul Drysch, Herndon, VA (US); Keith Brendley, Herndon, VA (US); Kurt Brendley, Herndon, VA (US)

(73) Assignee: PreAct Technologies, Inc., Portland, OR (US)

( * ) Notice: Subject to any disclaimer, the term of this patent is extended or adjusted under 35 U.S.C. 154(b) by 0 days.

(21) Appl. No.: 17/156,160

(22) Filed: Jan. 22, 2021

(65) Prior Publication Data

US 2021/0223391 A1    Jul. 22, 2021

Related U.S. Application Data

(60) Provisional application No. 63/117,230, filed on Nov. 23, 2020, provisional application No. 63/059,727, filed on Jul. 31, 2020, provisional application No. 62/964,350, filed on Jan. 22, 2020.

(51) Int. Cl.
| | |
|---|---|
| *B60W 30/08* | (2012.01) |
| *G08G 1/16* | (2006.01) |
| *B60R 21/013* | (2006.01) |
| *B60W 40/09* | (2012.01) |
| *G01S 13/931* | (2020.01) |
| *G07C 5/00* | (2006.01) |
| *B60R 21/0134* | (2006.01) |

(52) U.S. Cl.
CPC ........ *G01S 13/931* (2013.01); *B60R 21/0134* (2013.01); *G07C 5/008* (2013.01); *G08G 1/16* (2013.01)

(58) Field of Classification Search
None
See application file for complete search history.

(56) References Cited

U.S. PATENT DOCUMENTS

| | | |
|---|---|---|
| 6,012,008 A | 1/2000 | Scully |
| 6,405,132 B1 | 6/2002 | Breed |
| 6,438,475 B1 | 8/2002 | Gioutsos |
| 6,616,186 B1 | 9/2003 | Midorikawa |
| 6,658,336 B2 | 12/2003 | Browne |
| 7,119,888 B2 | 10/2006 | Beuschel |
| 7,909,359 B2 | 3/2011 | Inoue |
| 9,701,307 B1 * | 7/2017 | Newman ............... B60W 10/04 |
| 11,465,619 B2 * | 10/2022 | Silva ................. B60W 30/0956 |
| 2002/0099485 A1 * | 7/2002 | Browne .................. G01S 13/87 |
| | | 701/45 |
| 2003/0030583 A1 | 2/2003 | Finn |

(Continued)

FOREIGN PATENT DOCUMENTS

WO    2006052699 A1    5/2006

OTHER PUBLICATIONS

International Search Report (PCT/ISA/220 & PCT/ISA/210) and Written Opinion (PCT/ISA/237) issued in PCT Application No. PCT/US20/43036 dated Oct. 21, 2020 (20 pages).

*Primary Examiner* — John F Mortell
(74) *Attorney, Agent, or Firm* — Nixon & Vanderhye P.C.

(57) ABSTRACT

A vehicle safety system performs close-in incipient collision detection that combines high sample rate near-field sensors with advanced real-time processing to accurately determine and report risky driver behavior.

26 Claims, 14 Drawing Sheets

Sense Imminent Collision

Near-field kinematics approach with ultra high speed vision & unmatched accuracy Detect and Track Threat Object classification, probability engine, predictive analytic done in microseconds Communicate Near Miss or Hit Transmit sensor and telemetry data along with calculated hit and severity predictions to cloud storage

(56) References Cited

U.S. PATENT DOCUMENTS

| | | |
|---|---|---|
| 2003/0191568 A1 | 10/2003 | Breed |
| 2005/0060069 A1 | 3/2005 | Breed |
| 2005/0114000 A1* | 5/2005 | Cashler ............... B60R 21/013 340/436 |
| 2005/0134440 A1 | 6/2005 | Breed |
| 2005/0195383 A1 | 9/2005 | Breed |
| 2005/0278098 A1 | 12/2005 | Breed |
| 2006/0031015 A1 | 2/2006 | Paradie |
| 2007/0109111 A1 | 5/2007 | Breed |
| 2007/0152803 A1 | 7/2007 | Huang |
| 2007/0228704 A1 | 10/2007 | Cuddihy |
| 2008/0046150 A1 | 2/2008 | Breed |
| 2008/0084283 A1* | 4/2008 | Kalik ............... B60Q 9/00 701/301 |
| 2008/0119993 A1 | 5/2008 | Breed |
| 2008/0133136 A1 | 6/2008 | Breed |
| 2008/0201042 A1 | 8/2008 | Cuddihy |
| 2009/0192710 A1 | 7/2009 | Eidehall et al. |
| 2011/0190972 A1* | 8/2011 | Timmons ............... G08G 1/167 701/31.4 |
| 2011/0295467 A1 | 12/2011 | Browne |
| 2013/0054103 A1* | 2/2013 | Herink .................. B60T 7/22 701/65 |
| 2015/0283974 A1 | 10/2015 | Schlittenbauer |
| 2016/0280134 A1 | 9/2016 | Miura |
| 2017/0097243 A1 | 4/2017 | Ricci |
| 2017/0101093 A1 | 4/2017 | Barfield, Jr. et al. |
| 2018/0075309 A1* | 3/2018 | Sathyanarayana ... G05D 1/0055 |
| 2018/0105180 A1 | 4/2018 | Fung et al. |
| 2018/0120417 A1 | 5/2018 | Matsunaga |
| 2018/0231974 A1 | 8/2018 | Eggert |
| 2018/0293449 A1 | 10/2018 | Sathyanarayana et al. |
| 2019/0001969 A1 | 1/2019 | Moennich |
| 2019/0077402 A1 | 3/2019 | Kim |
| 2019/0391582 A1* | 12/2019 | Jung .................... G05D 1/0088 |
| 2020/0207358 A1* | 7/2020 | Katz ...................... G06F 3/017 |
| 2020/0301438 A1 | 9/2020 | Zhao |
| 2020/0394915 A1* | 12/2020 | Salles .................. B60W 10/10 |
| 2021/0192862 A1* | 6/2021 | Nagata ................. G08G 1/0112 |

* cited by examiner

DOOR CLEARANCE DETECTION

SIMPLE HARDWARE

FLEXIBLE PACKAGING

| Feature | | Light Ring Network | Ring Network | Star Network |
|---|---|---|---|---|
| | PreCrash and Butler Service | Yes | Yes | Yes |
| | ADAS | No | Yes | Yes |
| | AV (L4 & L5) | No | No | Yes |
| Function | Video Output | No | Yes (Limited for 80fps for 1000BaseT1) | Yes (full frame rate >200fps with 1000BaseT1) |
| | Required Comm | 1xHSCAN (2 I/O) | 1X1000BaseT1 Ethernet (2 I/O) | 4x1 000Base T1 Ethernet (8 I/O) |
| | Required Controller Modules | None | ADAS controller with gigabit ethernet connection | PreAct developed controller with 4x gigabit ethernet connection |

FIG. 3

High Level System Architecture

Software Block Diagram

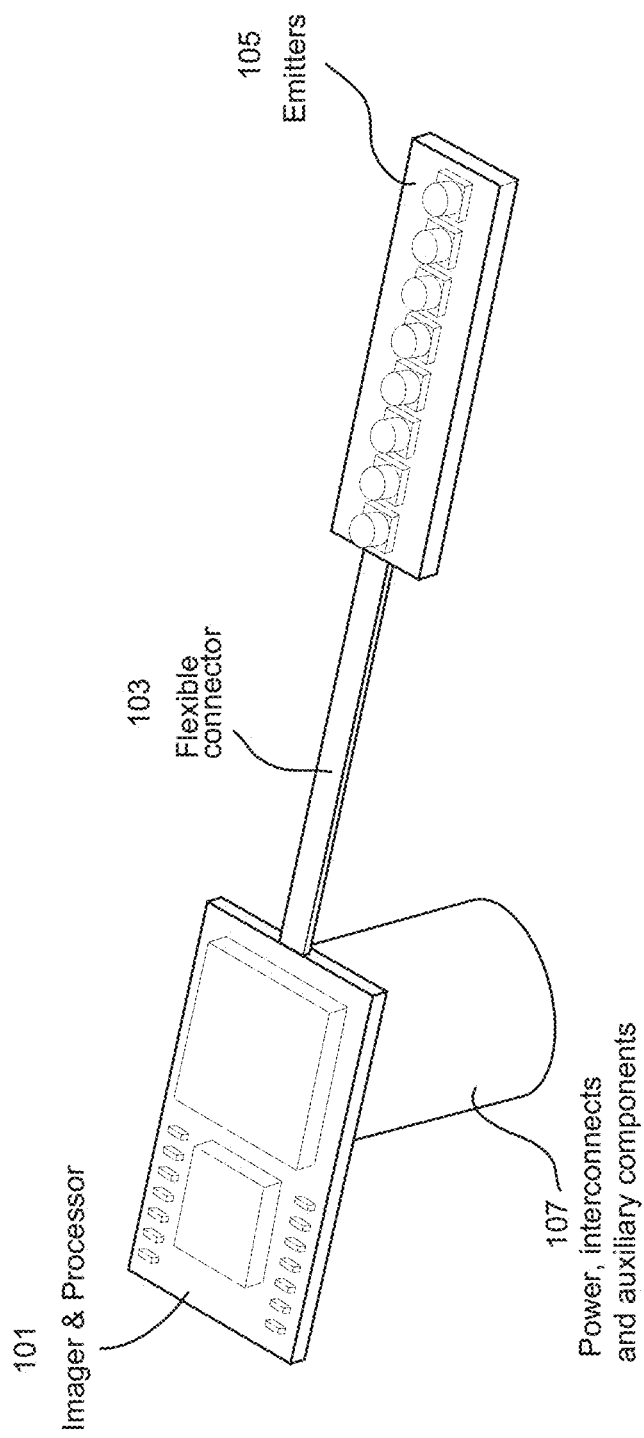

US 11,802,959 B2

VEHICLE DRIVER BEHAVIOR DATA COLLECTION AND REPORTING

CROSS-REFERENCE TO RELATED APPLICATIONS

This application claims the benefit of U.S. patent application Nos. 62/964,350 filed Jan. 22, 2020 (6917-3); 63/059,727 filed Jul. 31, 2020 (6917-7); and 63/117,230 filed Nov. 23, 2020 (6917-8), each of which is incorporated herein by reference.

This application is related to U.S. patent application Ser. No. 16/927,466 filed Jul. 13, 2020; Ser. No. 16/883,679 filed May 26, 2020; 63/030,009 filed May 26, 2020; 62/873,721 filed Jul. 12, 2019; and 62/852,841 filed May 24, 2019; each incorporated herein by reference.

BACKGROUND & SUMMARY

Even with all of the safety devices built into vehicles in the United States, 11% of the over 41 million accidental injuries reported in the U.S. at emergency rooms are due to traffic incidents. In 2017 alone, over 37,000 people lost their lives due to traffic accidents in the U.S. Most of these fatalities occurred in vehicles with fully operational airbags and where the occupants were using seatbelts. Clearly, existing safety technology, even when properly utilized, is insufficient to protect people from serious injury and even death. There is a long felt but unsolved need to address and overcome these limitations, which every year are costing tens of thousands of lives in the US alone and hundreds of thousands of lives worldwide.

Risky driving behaviors that lead to accidents are typically described in human driver terms, such as weaving in and out of lanes; failure to yield right of way; driving under the influence of alcohol, drugs or other judgment-impairing substance; speeding; not paying close attention to road conditions; tailgating; and driving while drowsy or distracted. These terms are subjective and can be both inaccurate and misleading. A driver judged as not paying close attention, for example, may merely have made a mistake in reading a road sign. Even speeding is not always dangerous if the driver is merely keeping up with traffic and is otherwise driving in a safe and sensible manner.

What is needed are quantitative measures of dangerous or risky driving that are based on measured results.

There have been attempts at building such statistics using various means. Some insurance companies, for example, have begun using telematics to monitor driving habits. A telematics system is often a sensor cluster comprised a wireless network adapter, an accelerometer, a GPS receiver, an OBD-II interface, and a processor—or sometimes, an app on the driver's smart device equipped with a GPS receiver and an accelerometer. The telematics system continually gathers information and reports it for evaluation. See for example US20190392529 and US20200020029. US20190375416 discloses using artificial intelligence to score driving behavior based on driving data collected from telematics systems.

While much work has been done in the past, further improvements are desirable. In particular, it would be highly desirable to gather more accurate data that more specifically indicates risky driving behavior.

BRIEF DESCRIPTION OF THE DRAWINGS

FIG. 3 shows several different hardware architectures for integrating the sensor system into different hardware communication schema.
FIG. 6 shows a non-limiting design approach for an example non-limiting time-of-flight (TOF) sensor.

DETAILED DESCRIPTION OF EXAMPLE NON-LIMITING EMBODIMENTS

Figure 1:
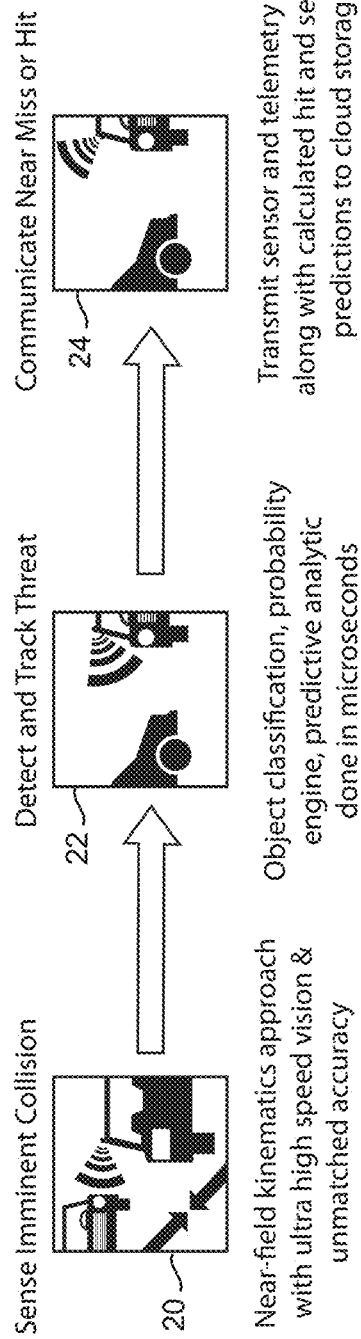
FIG. 1 is a block diagram of an example overall process.

Current insurance automotive measurement schemes typically seek to correlate limited data (e.g., acceleration and speed) with accidents. There are at least two flaws with this approach:

1) The defining characteristic of an accident is that the vehicle is striking something else. The most relevant information is therefore typically the distance from ego (i.e., the vehicle and driver under evaluation) to the threat, which is currently not being recorded.

2) Accidents are relatively rare events. While some drivers have a record of accidents leading to a major, fatal collision, many or most do not. Rather than try to correlate data to rare events, one could instead use the data to first characterize drivers and/or driving, and then correlate the driver/driving characteristics with accidents. In this way, much larger data groups are provided—meaning much more data which can then have meaningful number of accidents per group on which to base statistically significant correlations.

Example non-limiting technology herein provides an innovative safety technology that uses one or more advanced sensors to intelligently evaluate and detect risky driving behavior for reporting or other purposes. For example, the example non-limiting technology herein provides a sensor and processing system which in some embodiments operates quickly enough (or is capable of operating quickly enough) to accurately determine if/when a crash is imminent in the vanishingly short time available to act on that knowledge. Such a sensor suite and associated technology is thus able to also accurately determine whether driving behavior relative to another vehicle(s) is risky (e.g., likely to cause or lead to an accident) even though no accident results from the interaction.

Such technology can for example be used to identify or predict risky driving behavior such as "close calls" or "near misses" of potential accidents and crashes in addition to recording detailed data leading to actual crashes. This allows far more robust and effective safety measures to be employed as opposed to today's technology which provides no data regarding near misses and relatively limited data once a collision occurs.

The system in one embodiment can continually operate while the vehicle is in operation. It can log data for real time or intermittent reporting (e.g., over a wireless or other network), making determinations in real time and display the determinations for driver safety training, and/or taking preventive actions in the event of a near-certain collision. In one embodiment, logging of detailed information may be provided in the short term (e.g., for recovery and analysis in the event of an actual accident), and determination, selection and/or abstracting of the data may be provided in the longer term (e.g., to reduce the massive amount of data that would otherwise need to be reported). The determinations/selections/abstractings take the form of predictions of 1) collision likelihood and 2) potential severity of collision.

Instead of merely (or in addition to) monitoring the "jerkiness" of driving behavior or vehicle speed (which may in fact be safe and not erratic) such as through use of a common accelerometer, the example non-limiting embodiments sense and measure closing velocities, accelerations and other kinematic measures relating to the physical relationships. interactions and relative motion between the ego vehicle and other objects (including but not limited to other vehicles), as well as distances between the ego vehicle and other objects including other vehicles. The ability to accurately detect and measure relative distance and motion (e.g., velocity and acceleration) of ego vehicle relative to other objects is a significant enhancement as compared to merely measuring the motion of ego vehicle by itself. While cameras can also be used to capture video or other image information of physical relationships between ego vehicle and other objects, cameras generate vast amounts of data that typically must be transmitted and analyzed to provide useful information. While embodiments herein can also use cameras or other ranging sensors (e.g., LIDAR, RADAR, etc.), example non-limiting technology herein provides one or more sensors exhibiting extremely fast, responsive motion and/or distance detection that provides accurate, unambiguous and potentially compact direct indications of how ego vehicle is moving and positioned relative to other, non-contacting objects in its immediate neighborhood. In some embodiments, the sensor suite can detect instantaneous or nearly instantaneous closing velocity, acceleration and/or distance between ego vehicle and other stationary and/or moving objects, providing accurate information from which likelihood or risk of collision can be inferred or predicted. Such information can be collected over time to predict or measure risk of future accidents (and their severity) associated with a particular driver(s), a particular vehicle or kind/type/model of vehicle, a particular driving environment (e.g., geographical, weather, time of day, season, etc.), particular driver age or other characteristics (e.g., teens vs. older people, elderly drivers, drivers who are out late, etc.), particular driving routes/cities/highway types, or any combination or subcombination of these.

In one example embodiment, these data feed into two or more different algorithms for real-time or other processing: 1) a Collision Probability Engine (CPE) and 2) a Collision Severity Calculator (CSC). The CPE uses the kinematics of the ego vehicle and the sensed kinematics of threat objects to calculate all (or likely) physically possible outcomes. From that, it can calculate the probability of a collision. As the underlying algorithms are relatively simple, they may be calculated in real time on computation platforms of reasonable size, power and cost for the automotive market. The CSC operates in similar fashion. The potential physically-realizable paths that result in a collision are evaluated as to the potential threat they pose should a collision actually occur. For example, the threat posed by having a large object impact the driver's door would be judged as greater than the threat of sideswiping a much smaller object.

The active sensor suite can be used to report events such as near misses or even actual collisions in real time or on a delayed basis for analysis and action. For example, if real time reporting is used, a fleet dispatcher can check with a driver after a collision is reported to see if assistance is needed or a parent could call a teen driver to find out if everything is okay. Based on any reporting scenario, an insurance company can modify insurance coverage of a habitually risky driver or require the driver to obtain driver safety education.

The active sensor suite can also distinguish with high accuracy between safe driving and risky driving. A driver may be weaving in and out of traffic, for example, to avoid aggressive drivers sharing the road, which mere acceleration-based telematics of vehicle motion cannot reveal. The example non-limiting active sensor suite can detect such excellent driving skills and provide rewards such as good driving discounts or letters of congratulation for avoiding accidents in hazardous conditions instead of penalizing an excellent driver for taking successful evasive action to avoid accidents in challenging driving environments In some embodiments, processing can be performed locally in real time to give drivers feedback on how they are driving. In one embodiment, an additional example display could be onto a projected holograph or onto the scene projected on the windshield (e.g., augmented reality in the style of a heads up cockpit display in a fighter jet) and/or projects on the side or rear view mirrors, dashboard, or other surface visible to the driver. In other embodiments, the display could be a compact driving score value (e.g., 1 to 10, A through E, etc.) that indicates how safe or risky the driver is driving.

In some embodiments, data can be logged and reported in real time and/or intermittently. Raw collected data can be reported to a processor in the cloud which performs the analysis; or the data can be fully processed and results are reported; or the data can be partially processed and results can be reported along with some or all of the underlying raw data. In some embodiments, results can be reported and underlying raw data is reported upon request/demand.

Reducing scenarios to probabilities allows calculated probabilities to be added to the telemetry stream, as such data consume little bandwidth. Such compact telemetry is much more compact than video or raw TOF sensor data.

In addition to probabilities leading to a collision, it is possible to tell when an accident is actually occurring or has actually occurred with very high confidence.

Data analysis is in one embodiment expanded from probability of collision to listing collision parameters that can be correlated with fault. For example, the fault level for a situation when ego is braking because he was cut off suddenly would be lower than if ego was braking hard because the car in front was braking normally; the fault level would be higher for a side fender impact if ego were maneuvering towards another car that was traveling in a straight line, and so forth.

One example non-limiting embodiment of a system is packaged as a dash cam(era). The system can in one example implementation be packaged with the CWTOF with 120° FOV, a cellular uplink (and/or Bluetooth connection to user's phone), IMU for precision ego motion analytics, GPS and a ruggedized nonvolatile memory unit "black box." This "black box" can be recovered and used for crash reconstruction, by providing kinematic data for events just before, during and following the collision for pre-crash, post-crash and other applications.

In other embodiments, if a high bandwidth connection is available, the system can automatically send a burst of data during or immediately after a collision to another computer in the cloud in order to provide close to real time indications of what is happening or has just happened. While in some embodiments only telemetry-level data would be uploaded automatically, the system would have ample storage to save, say, 25 of the latest events in a manner that would preserve the data even in the event of a catastrophic accident. A data recipient such as an insurer, employer, parent, rental car agency, law enforcement, health care provider, etc. could then (with appropriate authorizations and/or consent) command the system to upload or otherwise obtain actual sensor output for specific events of interest.

In one embodiment, as a CWTOF sensor, the system collects both B&W video and the distance (Z)-map. Both can be stored, even though the system in some embodiments uses only Z-map data for its probability calculations.

The system works day or night and quite well in snow, rain or fog. The system in some embodiments could measure many atmospheric conditions, so as to measure how safe the driver is being in inclement weather. This is possible by for example measuring the return off of retroreflective headlamps or through the use of other sensors such as moisture sensors, ice sensors, temperature sensors, windshield wiper operation monitoring, etc. In the case of retroreflective headlamps, if the system receives an unusually low return on a large number of samples, then that probably correlates well with atmospheric extinction coefficient, which itself correlates with weather conditions.

The system in some embodiments can record ambient light levels to detect low visibility situations or otherwise measure visibility (e.g., it can even tell if the sun was in the driver's eyes during an event).

Since the system in one embodiment can output a very bright light in the NIR, lane markings, which are painted with special retroreflective paint, show up with excellent contrast. If the IMU (inertial measurement unit), for example, is indicating weaving-like behavior, this could be flagged in the telemetry stream, and the camera could record the event for later visual inspection.

Other features include:

Determine if an unreported crash happens

Determine the density of average traffic (e.g., driving in a congested area is far more conducive to an accident versus rural driving)

Parking behavior

The number of times a vehicle is in close proximity to another moving vehicle (e.g., two moving vehicles get to within a predetermined close distance such as say 10 feet while driving over 50 mph, etc.)

Some embodiments provide an "insurance" algorithm that identifies risky behavior and sets triggers. This "insurance algorithm" can be programmable/adjustable so that different insurance companies can customize the results differently. Such a risk assessment algorithm may detect the probability of collision, and may also apportion cause. For example, if there is a near miss from a head-on collision, and the threat car suddenly maneuvered to a collision course, then the fault would lay mostly with the threat car. If on the other hand, it was ego that maneuvered into a collision trajectory, then ego is at fault. Such algorithms may use a lot of data collection and then correlate recorded driving behavior with outcomes (e.g. driving records) over time. There is a big difference between someone who weaves in and out of traffic and continually cuts people off as compared to another driver who drives steadily but in a bad traffic environment, even if both see the same number of above-threshold probability events. Some embodiments can also send video of an accident plus/minus 5-10 seconds for insurance claims handling, as well as all kinds of triggered data.

Near miss and/or actual collision data can be sent to vehicle OEMs to enable them to understand an actual collision so they can improve upon severity reduction—not real time, but after the fact. From an accident reproduction point of view, it will be very valuable to have that data.

A collision causality model may be used so that in the event of a collision, the system can tell collision speed, severity, and who is the likely perpetrator that caused the incident. Such an analysis would assist or remove the need for more insurance company claim adjusters.

In one embodiment, a combined solid state LIDAR and ToF sensor with a SoC (system on a chip) doing sensor fusion and normal precrash functionality plus ADAS may be provided in the various use cases described herein.

Fusing ADAS long-data with close-in high speed systems may improve probability engine results.

Employing the same or similar techniques may improve the severity estimation.

Fuzing a long-range, slower (but more accurate) sensor with a close-in system may be provided in some embodiments. The longer range system could be LIDAR or Doppler radar since that yields a very accurate speed towards the vehicle. Some embodiments may use the data to calibrate outputs on the fly and avoid calibrating to something that is less accurate. Varying the CWTOF parameters on the fly may be used to extend range, while still allowing high speed sampling for close in objects.

Active Sensor Suite

An active sensor suite may use high-speed, near-field optics and embedded computing or other example non-limiting high speed sensing, tracking and processing technology. Example non-limiting embodiments can determine precisely when and where (e.g., in which direction) a collision is going to occur, buying precious time to respond. With this forewarning, robust countermeasures can have sufficient time to engage. This may include for example external airbags that cushion the blow to pedestrians or protect vehicle occupants from lethal side impacts. Larger and thus far more effective airbags can be employed that both inflate at slower speeds and serve to protect occupants on all sides. The vehicle itself can improve its crashworthiness by adjusting the suspension and internal cab features such as the steering column or moving seats.

In other embodiments, there is no or may not be any deployment of a countermeasure. For example, in some embodiments, no countermeasure is present and information is collected, stored and forwarded for other purposes (e.g., insurability/risk evaluation). In other embodiments, the system feeds collision probability, time, severity and impact location to another system, and the other system uses that information to decide whether to control the countermeasure to deploy.

In example non-limiting embodiments, a relevant time window for the technology herein to operate is shortly before an actual or potential impact—i.e., from a time when the driver of the vehicle can do little to avoid or minimize the impact should it occur. Such time window imposes real time and near field constraints that lessens the intent of the driver(s) and reduces the collision problem to more deterministic factors such as Newtonian physics. In some embodiments, rather than avoiding a collision, the vehicle automatically and swiftly prepares for a collision beginning at a time instant so soon before the collision actually occurs that the collision is highly predictable and unavoidable. Such a time window can begin for example at one second, or one-half second (500 milliseconds), or 0.25 seconds (250 milliseconds), or 0.2 seconds (200 milliseconds), or 0.15 seconds (150 milliseconds), or 0.1 seconds (100 milliseconds) or 0.05 seconds (50 milliseconds), before instant of impact. A sufficiently short time removes all relevant human behavior, allowing crashes and near misses to be evaluated on purely quantitative terms. Some have measured the average time for humans to react to a visual stimulus at 0.25 seconds ("human reaction time interval"). It is unrealistic to expect the human driver of a vehicle to react and respond in less time than the human reaction time interval, and the principles of physics may dictate that based on the conditions (i.e., motion of the ego vehicle, road conditions, potentially motion of another vehicle, etc.) that are determined to exist at a particular instant in time, an accident or collision is or would have been unavoidable within the human reaction time interval subsequent to that particular instant in time.

Because deploying countermeasures such as air bags will often have the effect of distracting or hindering the driver from being able to see and/or operate vehicle controls effectively, deploying countermeasures too early could have deleterious effects of (a) preventing the driver from taking evasive action to avoid a collision or minimize its impact and/or (b) deploying a countermeasure before an impact is a certainty (and thus might still be avoidable). However, waiting until an impact is detected (as most modern systems do) wastes precious milliseconds before an imminent crash that could be used to deploy a lifesaving countermeasure.

Example non-limiting technology herein uses highly reliable very fast acting detectors that when combined with the appropriate software statistically have very few false positives within the short time window before a collision (i.e., they can be counted on to reliably detect with a high degree of certainty that a crash is both imminent and unavoidable) to deploy countermeasures such as air bags or other lifesaving techniques.

The example non-limiting technology herein fits well with the ADAS and AV architectures already being considered in the industry and in some cases even fielded across the industry. While these technologies themselves will provide further safety in crash avoidance, vehicle crashes, sadly, are projected to continue increasing globally before eventually declining decades from now. The example non-limiting technology herein holds forth the promise of making the roads safer in the very near future, and by a substantial margin. Deployed worldwide, the technology promises nothing short of a revolution in automotive safety that eclipses even the advances enabled by seatbelts and the current generation of airbags.

While the automotive industry is focused on active safety (e.g. ADAS), little effort is made towards passive safety technology (e.g. seatbelts and airbags). Where ADAS focuses on driver convenience in addition to safety, it accomplishes this by enhancing emergency maneuvers of the vehicle via means such as active braking and lane intrusion warnings. Example non-limiting embodiments herein, on the other hand, focus on safety at the last fraction of a second where no amount of vehicular maneuvers or braking can avoid an imminent or potential collision.

Example non-limiting technology herein provides sensors and system control architectures that are capable of collecting and processing many large quantities of data every second. This allows an extremely accurate countermeasure solution to be fully deployed in just a few milliseconds or less. Example non-limiting technology herein is able to accurately predict the collision of a vehicle with another vehicle or object and then launch one or a suite of countermeasures, such as advanced airbags, to protect occupants in ways heretofore considered impossible.

Example non-limiting embodiments provide a sensing and advanced processing system that can predict an imminent or potential crash with assurance. Adding even 50 milliseconds would roughly double the reaction time. While early simulation experiments indicate that as much as 250 milliseconds of warning of an imminent unavoidable collision is achievable, even a fraction of that would revolutionize the passive safety market. The non-limiting embodiment can also operate up to a second ahead of a crash for selected types of countermeasures and in selected scenarios. With the addition of more time, passive safety systems can do much more to prepare the vehicle for a collision: deploy exterior airbags, adjust the suspension, and inflate larger interior airbags at slower speeds. These combined measures translate directly into reduced injuries and fatalities due to the crash and certainly due to the airbag itself.

Additional example non-limiting features and advantages include:

High Speed—threat tracks leading predictions of collision and severity are developed in a very limited amount of time Near Field—Removes human intent (lateral or in-line) and is based purely on the physics of the objects (e.g., momentum under Newton's laws that cannot change a crash scenario significantly no matter what the human operator or an obstacle such as another vehicle might do or attempt to do)

Fast Real Time Processing—One example embodiment uses massive parallel processing of sensors feeding into distributed FPGAs (field programmable gate arrays) or similar computation capabilities.

Takes the velocity(ies) and/or acceleration(s) of objects into account when determining when a collision is imminent or will result in a close call.

Example non-limiting embodiments perform close-in collision detection that combines high sample rate near-field sensors with advanced real-time processing to accurately determine imminent threats and the likelihood of a collision. This allows applicable countermeasures to be deployed in some embodiments based upon the (high) probability of a collision, while also taking into account the type of threat, and the impending impact's location on the passengers of the vehicle. This new approach will soon transform the passive safety market to greatly reduce injuries from automotive crashes and safe lives.

For example:

Suppose one is driving a vehicle moving at 65 mph (30 m/s) and an oncoming vehicle is moving at 65 mph (30 m/s). The combined relative speed is 130 mph (60 m/s).

Let's assume the system needs 100 milliseconds advance notice to deploy the external airbags and other new passive safety features.

Therefore, the vehicle would have to determine an imminent threat when the oncoming vehicle is 6 meters away, about one vehicle length.

Example non-limiting technology herein waits until the last possible moment (or within a time window that includes the last possible moment) to automatically deploy a countermeasure when no human or machine maneuver can change the outcome (e.g., whether or not a crash occurs). In other embodiments, where no countermeasure is deployed, the system can collect data during this short time period that other systems are not able to sense or sense reliably in order to determine the cause of an accident and who is at fault and/or to detect whether a potential collision was averted by luck, by skill, or for some other reason.

Given the extreme rapidity of the required response in some embodiments, an example non-limiting system may use a sensor which can sample from at least 200 Hz to 500 Hz or faster. In one example non-limiting embodiment, the data from this sensor feeds into a high-speed processor to determine the vehicle trajectory with the accuracy of e.g., 10 to 20 centimeters. From this, the impact point on the vehicle is estimated along with the likelihood of serious collision. The timing and sequence of countermeasures, if any, are calculated and controlled. All of this happens (and needs to happen) in just a few tens of milliseconds in example non-limiting embodiments.

Additional non-limiting features include:

A system comprising: a sensor that senses an object; a processor operatively coupled to the sensor that determines, in response to object sensing, an imminent collision with the sensed object before the collision occurs; and a countermeasure operatively coupled to the processor, the processor controlling the countermeasure to deploy in response to determining the imminent collision.

The sensor may comprise a non-contact sensor.

The processor may determine an imminent or potential collision during a time window within the range of 250 milliseconds, 200 milliseconds, 150 milliseconds, 100 milliseconds, 50 milliseconds and/or 0 milliseconds (this is still useful since it would assist the standard inertial sensors to react more quickly and precisely) before a collision occurs. It may also determine a lower-probability of collision at longer times suitable for some types of countermeasures.

The countermeasure may comprise an air bag, a seat belt tensioner, an external pedestrian air bag, an adjustable seat, an active suspension system or other countermeasure. Or in some embodiment there may be no countermeasure and the purpose of the system is simply to gather data for current and/or later analysis.

The sensor may comprise a time-of-flight sensor, stereoscopic sensor or other.

The sensor may sense parameters relating to the range, xy position, rate of closing and direction of closing of the object.

The sensor may be disposed on a moving object or on a stationary object that tracks the moving object. For example, in one embodiment, the sensor is mounted at a stationary position that is subject to collision with a moving object. The sensor may sense an imminent collision, and deploy a countermeasure(s) (from/on the moving object, from/on the stationary position, or both) to minimize potential damage as a result of the imminent collision.

The processor may track the sensed object as it closes, and output the errors associated with the track The processor may use the track and the errors associated with it to determine the probability of an imminent collision.

In one embodiment, the system includes an actual collision detector, and the countermeasure is deployed in response to the actual collision detector detecting an actual collision.

In an alternative, a system comprises a sensor that senses a closing object; and a processor operatively coupled to the sensor that determines, in response to object sensing, an imminent collision with the sensed object before the collision occurs.

A method comprises sensing an object; determining, in response to object sensing, an incipient collision with the sensed object will occur in 250 milliseconds or less.

The sensing may be performed continually, and the deploying may occur at least in part after the collision occurs.

Example Non-Limiting System

Figure 8:
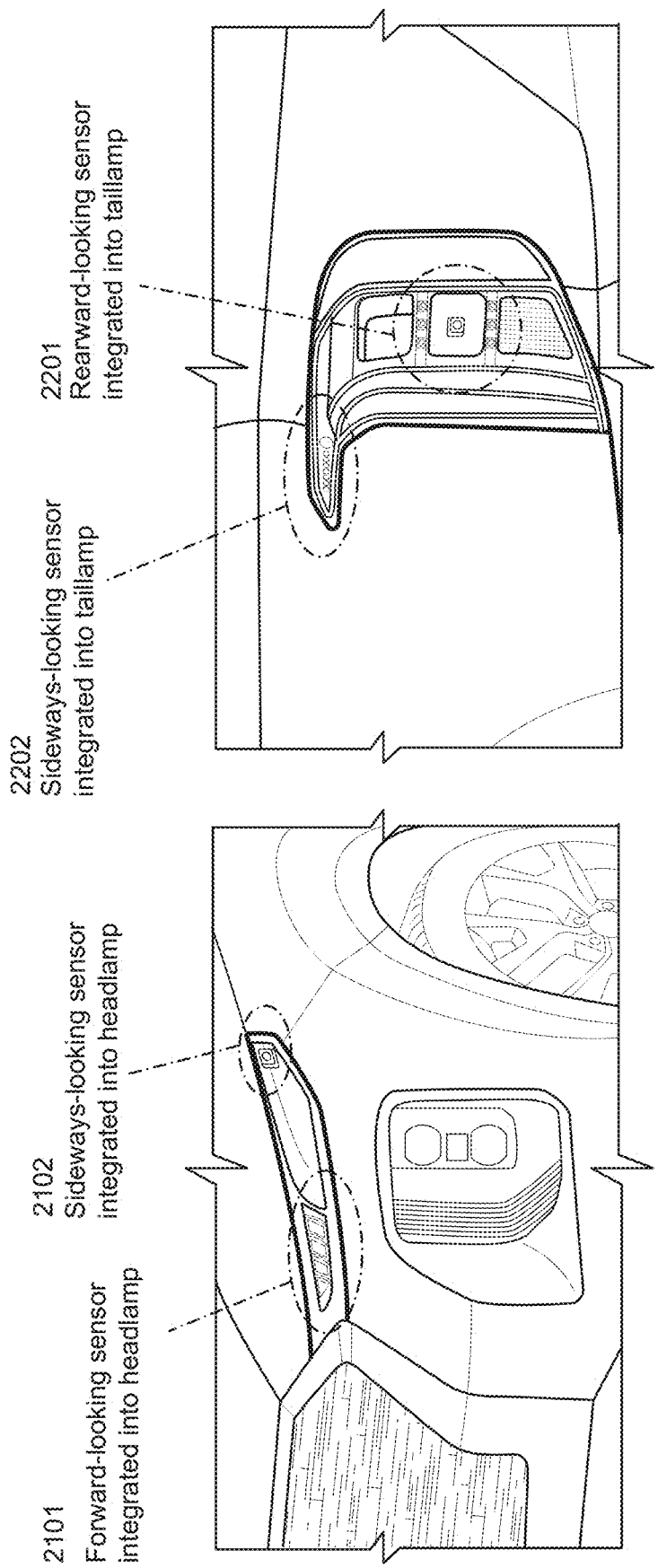
FIGS. 8A and 8B show example non-limiting approaches for packaging a sensor and edge processing assembly into headlamps and tail lamps.

Example non-limiting embodiments operate in three stages as shown in FIG. 1. First, the system senses an imminent or potential collision or other unsafe situation (20). This is accomplished in one example non-limiting embodiment by using a low-cost, high data-rate time-of-flight (TOF) or other type of fast sensor looking out no farther than for example 20 meters. Such sensing may be performed continually. Several sensors may, for example, be placed around the perimeter of the car housed in headlight and taillight fixtures such as shown in FIG. 8A, 8B. Other suitable sensors may include or comprise a stereoscopic sensor or a short-range radar sensor or an imaging acoustic sensor or a visible light sensor or an ultraviolet or infrared light sensor or a LIDAR sensor. Together, the sensors search the scene for elements that are moving relative to the vehicle. These elements are then defined as objects.

Second, the objects are tracked over time (22). The track is plotted with an error band that allows the probability of an impact to be calculated. In general, the errors tighten as the object approaches or closes. In addition, the size, speed and likely hit location of the object are used to estimate the potential severity of any collision.

In some non-limiting embodiments, the object must meet three criteria to be declared a valid threat:

1. It must be judged as having a sufficiently high severity as to present a threat. For example, a glancing blow to the rear fender would be less likely to be gauged a threat than a head-on collision (at least for protection of the vehicle occupants).
2. The object must have a high likelihood of impacting the vehicle.
3. The object must be large enough to warrant countermeasures to be launched. For example, a short, small box may not pass the threshold, while a much taller, telephone-pole sized object would.

Example non-limiting embodiments that have countermeasures may err on the safe side of not launching countermeasures if the determination of an imminent collision is uncertain. For this reason, a normal passive safety system as initiated by an IMU can also remain fully functioning as a back-up safety system to deploy countermeasures when impact is detected. The operations of the IMU will be enhanced by the information available from the track and severity estimations.

Figure 2:
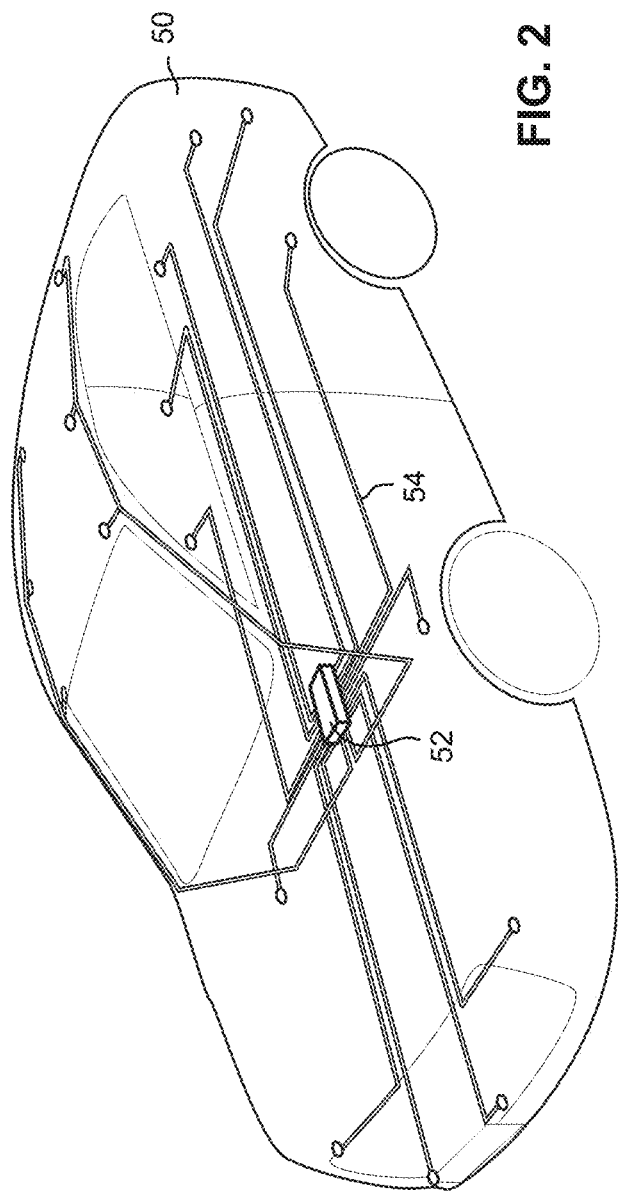
FIG. 2 is a schematic diagram of an example vehicle.

FIG. 2 shows is a visual image of an example non-limiting a stand-alone system in a passenger car 50, although the technology herein can be applied to any kind of vehicle or other moving object. It shows the system's ECU (electronic control unit including at least one processor and associated memory) 52 taking in and processing the vehicle's sensor feeds 54. The system can be fully integrated with the vehicle systems including the IMU-based (e.g., accelerometer) airbag and seatbelt tensioner control system.

Figure 2A:
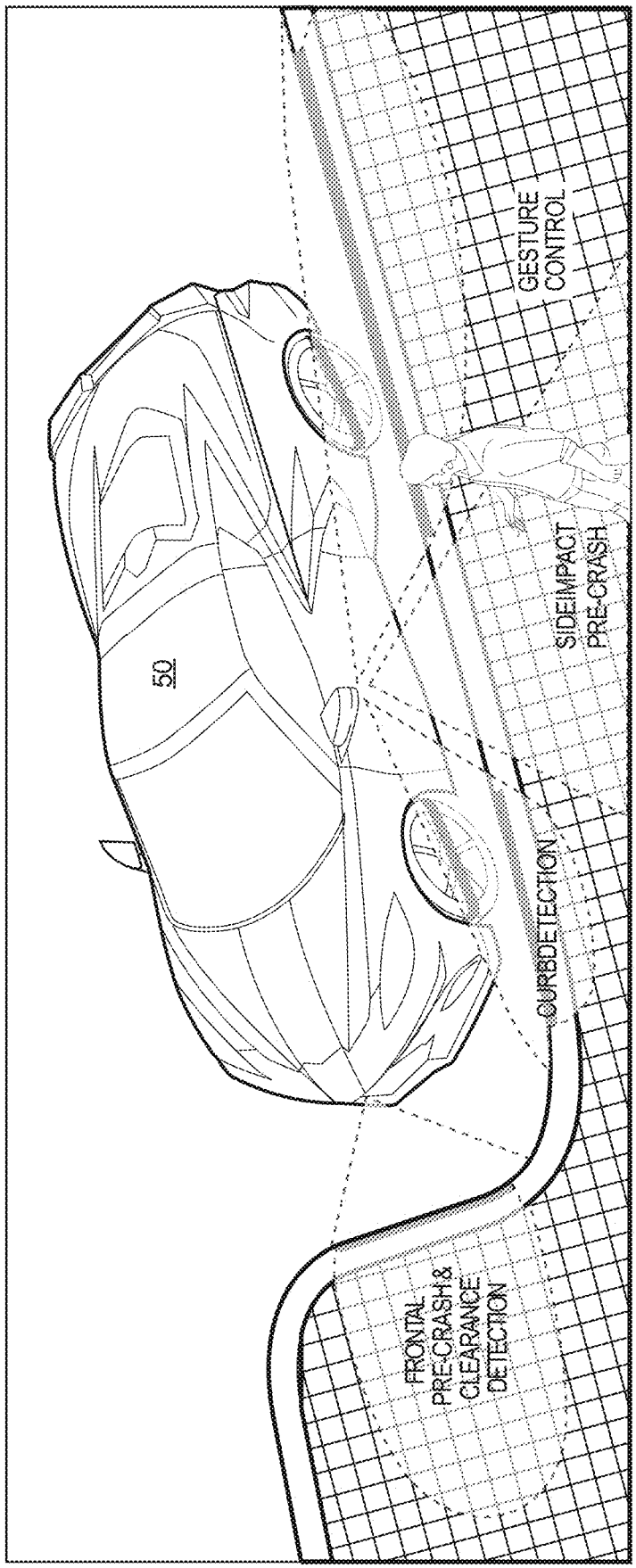
FIG. 2A shows additional features of an example vehicle.
Figure 2D:
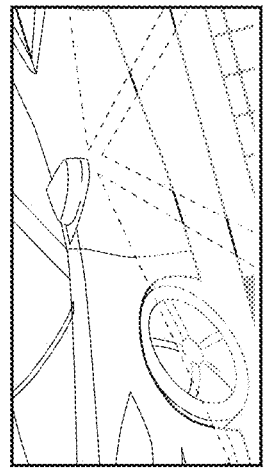
FIG. 2D shows example non-limiting door clearance detection.
Figure 2C:
FIG. 2C shows example a non-limiting hardware configuration exploded view of the FIG. 2A rear view mirror.
Figure 2B:
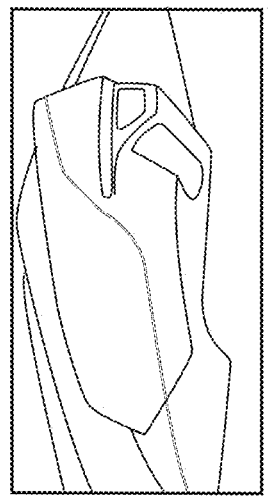
FIG. 2B shows example non-limiting packaging within a rear view mirror of a vehicle.

FIGS. 2A-2D show additional example applications for the same sensor suite and associated system including for example frontal pre-crash and clearance detection, curb detection, side impact pre-crash detection, gesture control (FIG. 2A). FIG. 2D shows example door clearance detection as a secondary or auxiliary function if the sensor is disposed on the side of vehicle 50 such as within a rear view mirror. FIGS. 2B and 2C show example sensor packaging for sensors within rear view mirror assemblies (FIG. 2B) providing side mounted multidirectional arrays (FIG. 2C), as discussed below.

In more detail, FIGS. 2A & 2D show other example use cases for the FIG. 2B/2C sensor configuration (and which can also be applied to other sensor configurations such as shown in FIGS. 8A/8B) including but not limited to:

Frontal PreCrash & Clearance Detection—Advance passive safety system such as intelligent airbags and seatbelts by detecting an imminent impact 50-60 milliseconds prior to contact.

Side Impact Precrash: Advance passive safety system such as intelligent airbags and seatbelts by detecting an imminent impact 50-60 milliseconds prior to contact.

Automatic Door Opener Clearance Detection—determines ground and object clearance for automatic door openers and manual door opening.

Curb detection—Identify curbs forward, side, and aft of the vehicle for automated parking or park assist. Especially useful for independent rear steering such in the Hummer EV or Mercedes S-class.

Gesture Recognition—The driver with or without a key fob can make a gesture to control various aspects of vehicle operation such as rolling-up the windows after parking car, turning on or off the vehicle lights, locking or unlocking the vehicle, etc.

FIG. 3 shows more detail for example non-limiting hardware integration approaches. In this case, "butler service" refers to features such as gesture recognition or sensing that the car is parked too close to another for safe egress. In the light ring network example, the precrash sensors (shown here as circular arrays of emitters) are linked using a private gigabit Ethernet connection. The connection to other vehicle processors and apparatus is via the standard vehicle CAN bus. This supports precrash and butler services, but has insufficient data rate to support most ADAS and AV applications. In the ring network example, the ring network architecture is similar to the light ring network, except that it uses a vehicle-level gigabit Ethernet to send data to ADAS processors which can be enhanced to provide sensor support functions. However, there is still insufficient bandwidth to support most AV applications. In the star network example, the star network uses multiple gigabit Ethernet connections to communicate to a central processor, thereby having sufficient bandwidth to pass full-frame, high-speed video that is required by many AV applications. The star network example shown includes an additional proprietary processing board such as shown in FIG. 6 to provide a processor for sensor imaging. Any combination of these and/or other network topologies may be used.

Figure 4:
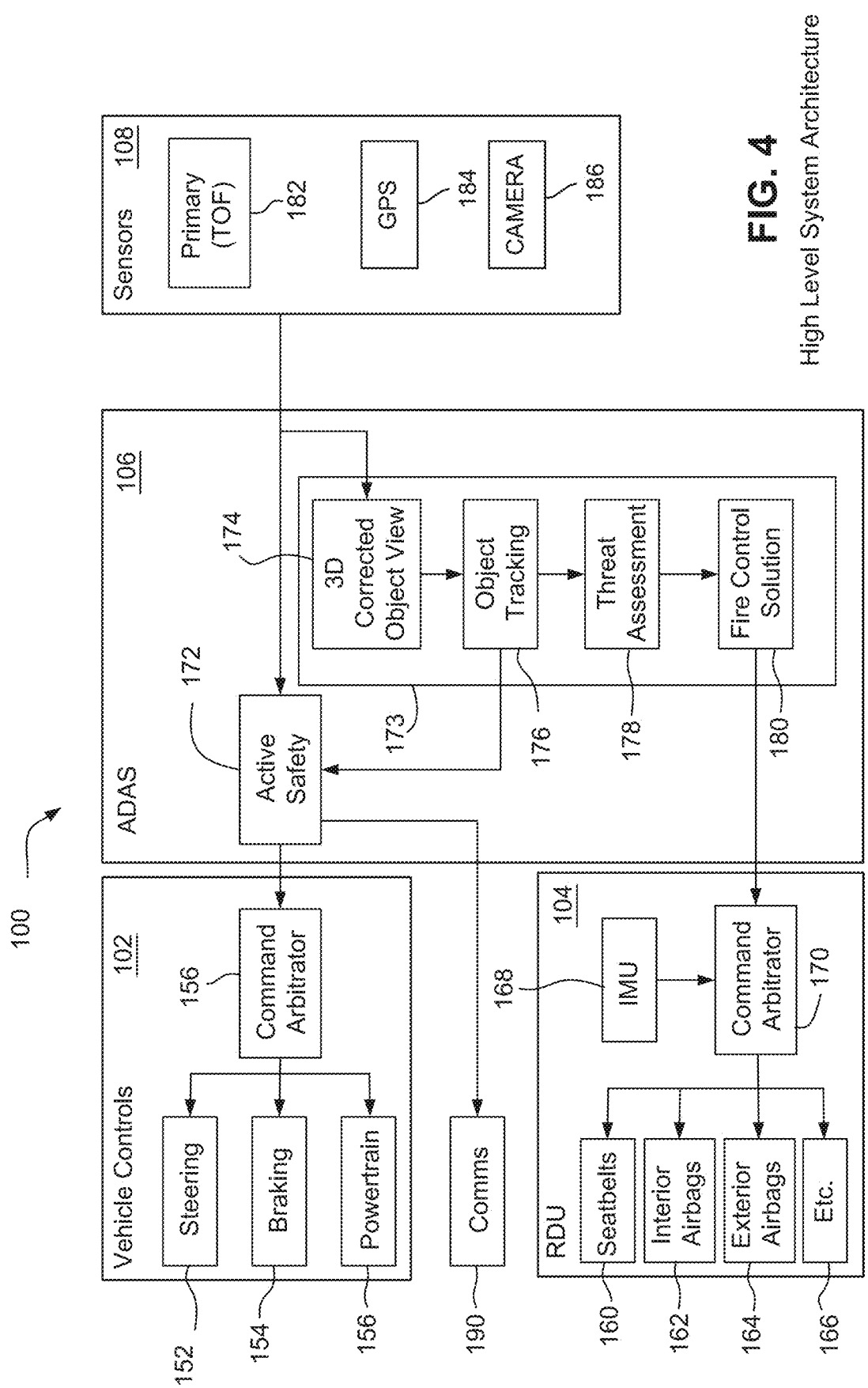
FIG. 4 shows an example block diagram of a non-limiting high level system architecture.

FIG. 4 is a block diagram of an example non-limiting high-level system architecture 100 that includes vehicle controls 102, a countermeasure deployment system 104, an advanced driver assistance system (ADAS) 106 and sensors 108. While the countermeasure deployment system would not be used in near misses, it would be activated in cases where there is an actual collision in some embodiments.

In the example shown, the vehicle controls 102 including steering 152, braking 154, powertrain 156 and command arbitrator 158 may be conventional and the same ones commonly used on any or many modern vehicle(s). The RDU 104 may include a conventional inertial measurement unit (IMU) 168 including inertial sensors such as accelerometers and/or gyrosensors but in this case its output is provided to a command arbitrator 170 that controls deployment of various countermeasures including seat belt restraining system 160, interior airbags 162, exterior airbags 164 and other countermeasures 166. In the example shown, the seatbelts 160 and interior airbags 162 can be enhanced to accept control from the IMU 168 (indicating a collision has occurred) or via the command arbitrator from ADAS 106 (indicating a collision is imminent but has not yet occurred) so the seatbelts tighten and the airbags deploy, and these countermeasures can behave differently depending on which system is actuating their deployment. Additional countermeasures 164, 166 not found on a conventional vehicle (e.g., pedestrian airbag system, bumper shock absorber stiffener, frame stiffener, automatic wheel turning, seatbelt tightener, etc.) may be deployed primarily in response to control from ADAS 106 detecting a collision is imminent. For example, one possible countermeasure could include last second chassis actions to mitigate the impact such as e.g., braking only with one brake (e.g., the right front brake or the left front brake, depending on the direction of expected impact) to help pivot the center of gravity to reduce the force of impact.

In the example shown, the ADAS Active Safety block 132 may be enhanced (as described below) and ADAS 106 may be provided with new functionality including a 3D corrected object view block 174, high speed object tracking 176, threat assessment 178 and fire control solution 180. Object tracking 176 is based on the 3D corrected object view 174, which in turn receives input from a sensor such as a very fast time of flight (TOF) or other sensor that can detect shape and direction. Sensor 182 can for example be non-contacting and based on technologies such as optical, electromagnetic, sound-based (e.g., ultrasonic), laser-based, radar-based, or any combination thereof. In one example embodiment, the sensor 182 (also referred to in the specification and the drawings as "TrueSense" or "TOF" or "time of flight" sensor) is as described in U.S. patent application Ser. No. 16/927,466 filed Jul. 13, 2020; Ser. No. 16/883,679 filed May 26, 2020; 63/030,009 filed May 26, 2020; 62/873,721 filed Jul. 12, 2019; and 62/852,841 filed May 24, 2019; each incorporated herein by reference as if expressly disclosed herein for purposes of disclosing/enabling/supporting FIG. 2C, FIG. 4 block 182, FIG. 6, and for all other purposes.

Figure 4A:
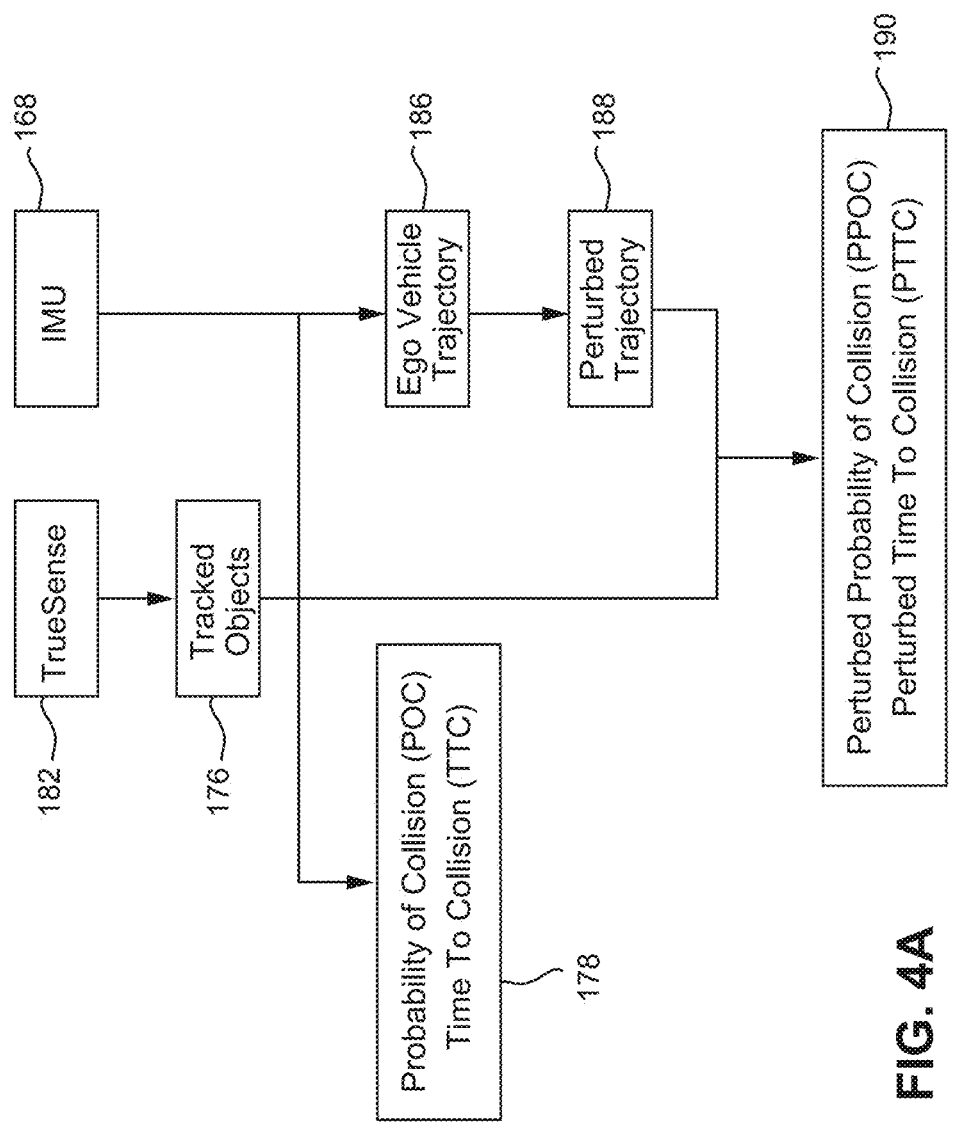
FIG. 4A shows an example non-limiting overall functional vehicle block diagram.

The 3D corrected object view 174 is used by threat assessment 178 to assess threat of a likely collision. If threat assessment 178 determines such a threat exists, it records it as a near miss if the threat did not collide and a collision if it does. In some embodiments, the threat assessment information is communicated to cloud storage via the communications system 190. FIG. 4A shows a more detailed example processing block diagram in which sensor 182 and IMU 168 provide outputs to determine both ego vehicle trajectory 186 and probability of collision (POC) and time to collision (TTC). The object tracking described above (block 176) is responsive to the output of sensor 182. A perturbed trajectory 188 is calculated to provide a perturbed probability of collision (PPOC) and a perturbed time to collision (PTTC). See e.g., Terry, "Collision operator and long-time behavior of a perturbed two-body problem", Celestial Mech.; (Netherlands); Volume: 23 pages: 119-130 (Sep. 1, 1981); Astarita et al, "Trajectory Perturbation in Surrogate Safety Indicators" Transportation Research Procedia Volume 47, Pages 393-400 (2020), each incorporated herein by reference.

At the core of one example non-limiting solution is an Edge Cross Correlation Engine (ECCE) or "edge processor". With ECCE, the example non-limiting system can perform rapid, direct 3D object definitions without the need for complex calibration or resorting to costly artificial intelligence (AI) methods. Once objects are formed, they can be readily tracked, which leads to the prediction of whether or not a collision will occur with its commensurate likelihood.

Figure 5:
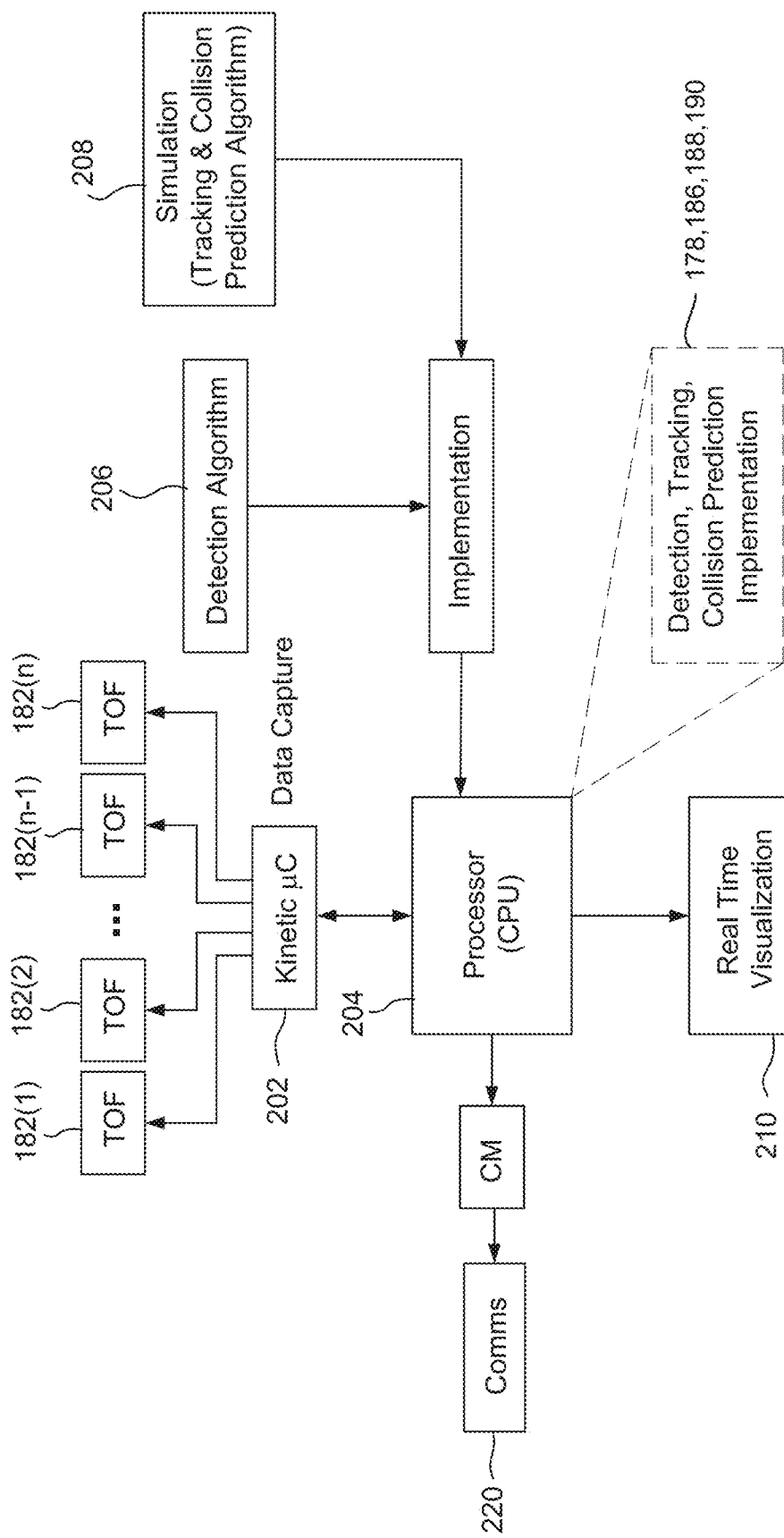
FIG. 5 shows an example block diagram of a non-limiting vehicle software architecture.

FIG. 5 shows an example non-limiting software block diagram of a software architecture that implements an ECCE described above. This architecture includes a kinetic microcontroller 202 that executes instructions stored in nonvolatile memory to very rapidly capture and process data from multiple time-of-flight (TOF) sensors 182. A processor (CPU) 204 implements detection, tracking and collision prediction by performing detection algorithm(s) 206 and processing algorithms based on simulation 208 (which may be used for tracking and collision prediction). The processor 204 may provide real time visualization 210 and output messaging via communications 190 to cloud storage. The sensor and/or edge processor 204 can be integrated in headlamp, tail lamp, rearview mirror housing, A pillar, B pillar, front grill, front bumper, rear bumper or trunk housing of a vehicle.

Example Processing Timing and Placement

In one example non-limiting embodiment, all processing takes place on the ego vehicle. In another non-limiting embodiment, little or no processing takes place on the ego vehicle and most or all processing instead takes place at a remote location such as in the cloud. In other embodiments, some processing takes place on the ego vehicle and some processing takes place in the cloud. In any of these cases, the processing can be performed in real time, in close to real time, or on a delayed basis.

If the ego vehicle includes a countermeasure, it is desirable to perform at least imminent collision on the ego vehicle in real time. However, some embodiments do not deploy a countermeasure or do not use certain processing in order to deploy a countermeasure. In such embodiments, processing can be delayed to close to real time or not real time. Furthermore, depending on the communications bandwidth available, it may be desirable for the ego vehicle to transmit to a remote device(s) all of the data it collections, some of the data it collects, or little or none of the data it collects. For example, given the speed at which sensors such as 182 can acquire data, such sensors can stream a huge amount of data in a very short time. It may be impractical or unnecessary to communicate such a firehose of data to a remote computer. Instead, the system on board the ego vehicle can analyze, filter, abstract, select from, condense, compress, parameterize, or otherwise process the sensor data to provide it in a more useful and/or condensed form for use by the remote computer. In the meantime however, it may be important or helpful for the ego vehicle to collect and preserve a maximum amount of data from just before, during and immediately after an actual collision for use by insurance companies, law enforcement authorities, courts and other decision makers.

Figure 5A:
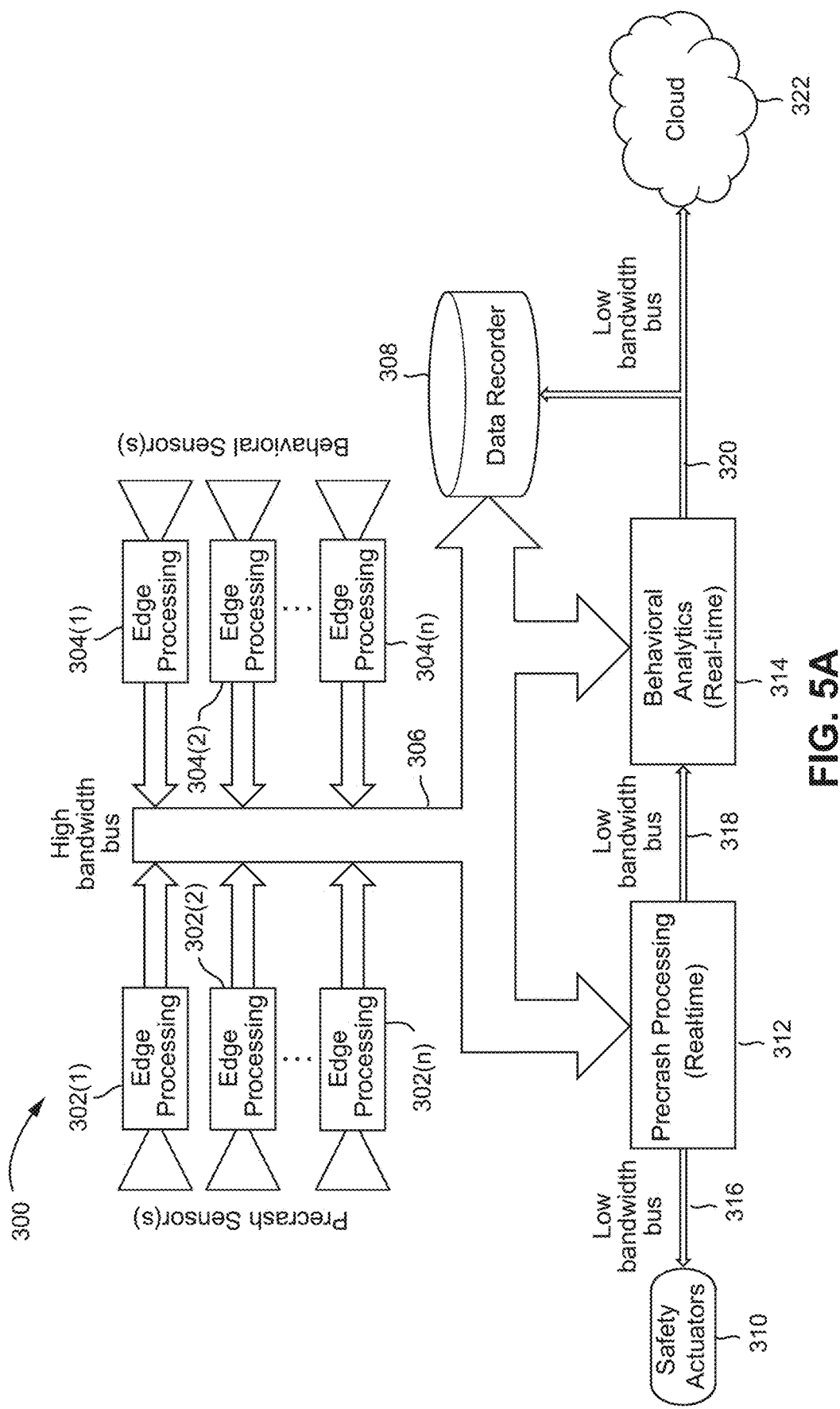
FIGS. 5A, 5B and 5C show example alternative vehicle processing and storage arrangements.

A non-limiting example process flowchart is shown in FIG. 5A. Precrash sensors such as the TrueSense TOF sensor 182 collect data at a high data rate. Much of these data are processed at the edge, conducting functions such as converting phase data into point cloud data, minimizing distortions, smoothing temporal fluctuations, demodulating encoded data and so forth. Other sensors that also contribute to eventual behavioral analytics, such as a driver camera C, may also be included, and these may also have some kind of edge processing, although that is not always required. Processed data from both source types are then communicated via a high data rate bus 305 such as IEEE 802.3 Ethernet networks. Data are streamed to 1) data recorder(s) 308, 2) precrash processor(s) 312 and 3) behavioral analytics processor(s) 314. The data recorder 308 would normally only record data for some set amount of time (such as last hour of driving for example) or more likely as related to specified events from the precrash processor 312 such as a near-miss or passing a close object at extreme speed. The precrash processor 312 in this example processes data in real-time so as to provide the appropriate precrash inputs to safety actuators such as smart seatbelts. In this example, precrash data are also passed to a real-time behavioral analytics engine 314 that determines whether the driver is performing within normal safety limits or not. By processing data on-board, the behavior analytics engine 314 can then communicate relatively low bandwidth data to the cloud 322 such as some safety score or perhaps a score with small segments of sensor data. Further post processing can be performed on data in the cloud.

Figure 5B:
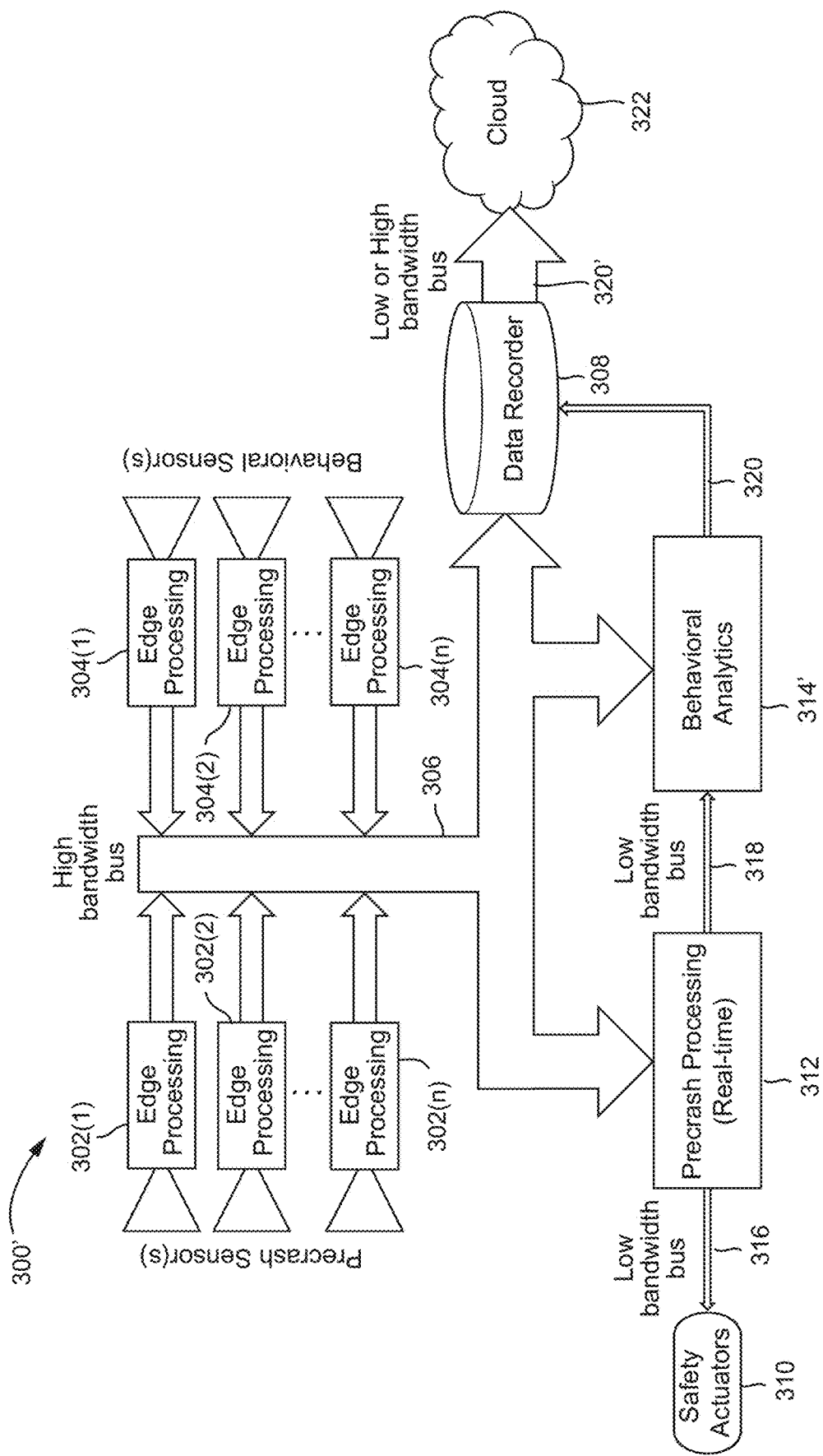

A further non-limiting example process flowchart is shown in FIG. 5B. Precrash sensors such as the TrueSense TOF sensor 182 collect data at a high data rate. Much of these data are processed (302) at the edge, conducting functions such as converting phase data into point cloud data, minimizing distortions, smoothing temporal fluctuations, demodulating encoded data and so forth. Other sensors that also contribute to eventual behavioral analytics, such as a driver camera, may also be included, and these may also have some kind of edge processing (304), although that is not always required. Processed data from both source types are then communicated via a high data rate bus 306 such as IEEE 802.3 Ethernet networks. Data are streamed to 1) data recorder(s) 308, 2) precrash processor(s) 312 and 3) behavioral analytics processor(s) 314'. The data recorder 308 would normally only record data for some set amount of time (such as last hour of driving for example) or more likely as related to specified events from the precrash processor 312 such as a near-miss or passing a close object at extreme speed. Since data are being uploaded to the cloud 322 from recorded data 308, the behavioral analytics engine 314' in this case does not need to be real time. It may also be somewhat simplified in that its primary function is to decide which data need to be stored, rather than providing final safety scoring itself. As before, the precrash processor 312 in this example processes data in real-time so as to provide the appropriate precrash inputs to safety actuators such as smart seatbelts. The data is communicated to the cloud 322 as connections and available bandwidth permit. It could, for example, be a streaming 5G service or a less regular WiFi connection when the vehicle is parked in the owner's garage. The amount of data to be communicated is largely a function of the sophistication of the on-board behavioral analytics engine 314' and client requirements.

Figure 5C:
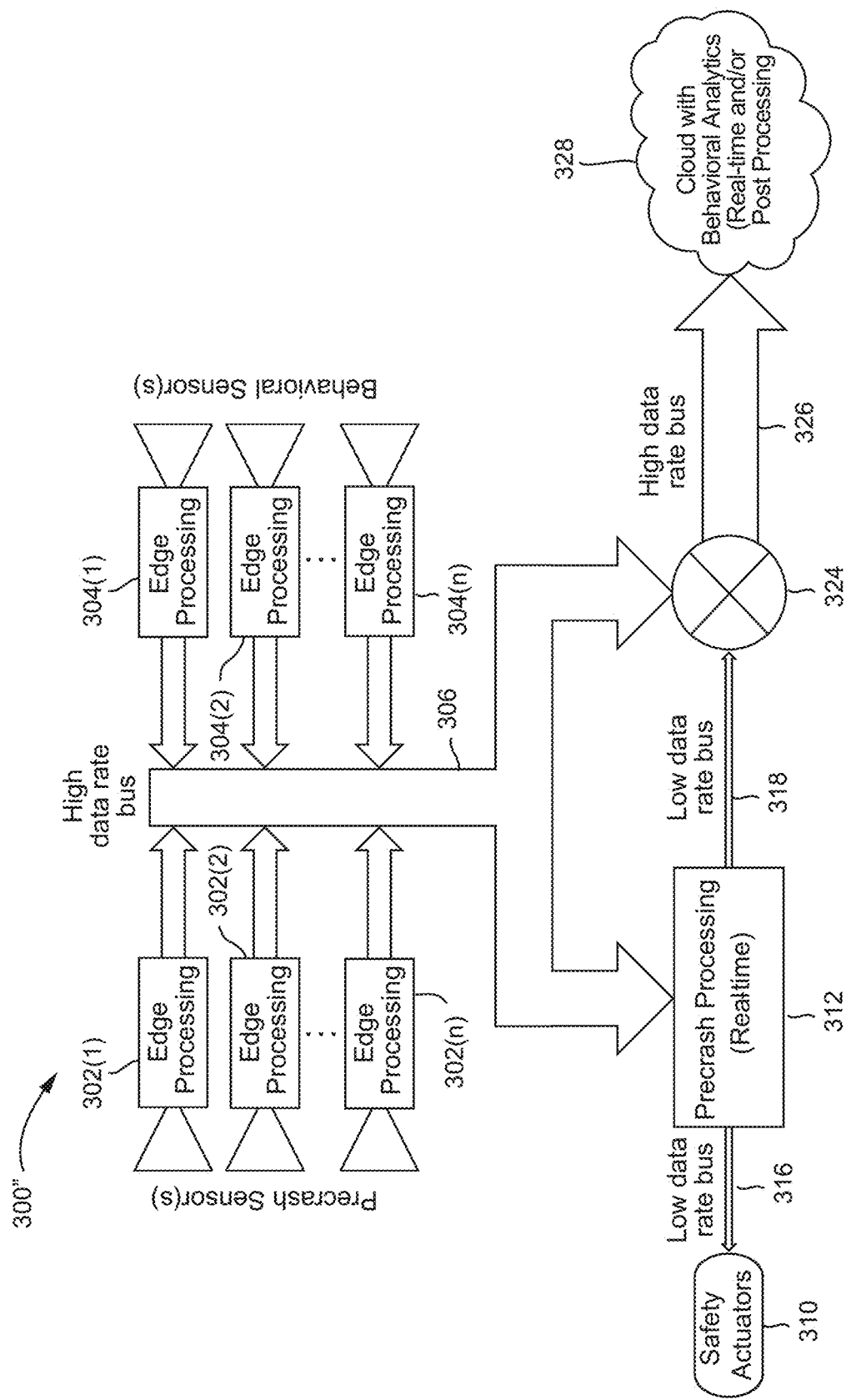

A further non-limiting example process flowchart is shown in FIG. 5C. Precrash sensors such as the TrueSense sensor 182 collect data at a high data rate. Much of these data are processed (302) at the edge, conducting functions such as converting phase data into point cloud data, minimizing distortions, smoothing temporal fluctuations, demodulating encoded data and so forth. Other sensors that also contribute to eventual behavioral analytics, such as a driver camera C, may also be included, and these may also have some kind of edge processing (304), although that is not always required. Processed data from both source types are then communicated via a high data rate bus 306 such as IEEE 802.3 Ethernet networks. Data are streamed to 1) precrash processor(s) 312 and 2) remotely located behavioral analytics processor(s) (328). Note that a data recorder could also be included as a backup, but it would not strictly be required since all or most data are being streamed to the cloud 328 in this example. The precrash processor 312 processes data in real-time so as to provide the appropriate precrash inputs to safety actuators such as smart seatbelts. Both processed precrash data and high-bandwidth sensor data are combined and transmitted to the cloud 328 to be stored and post processed for behavioral analytics and other purposes.

Figure 5D:
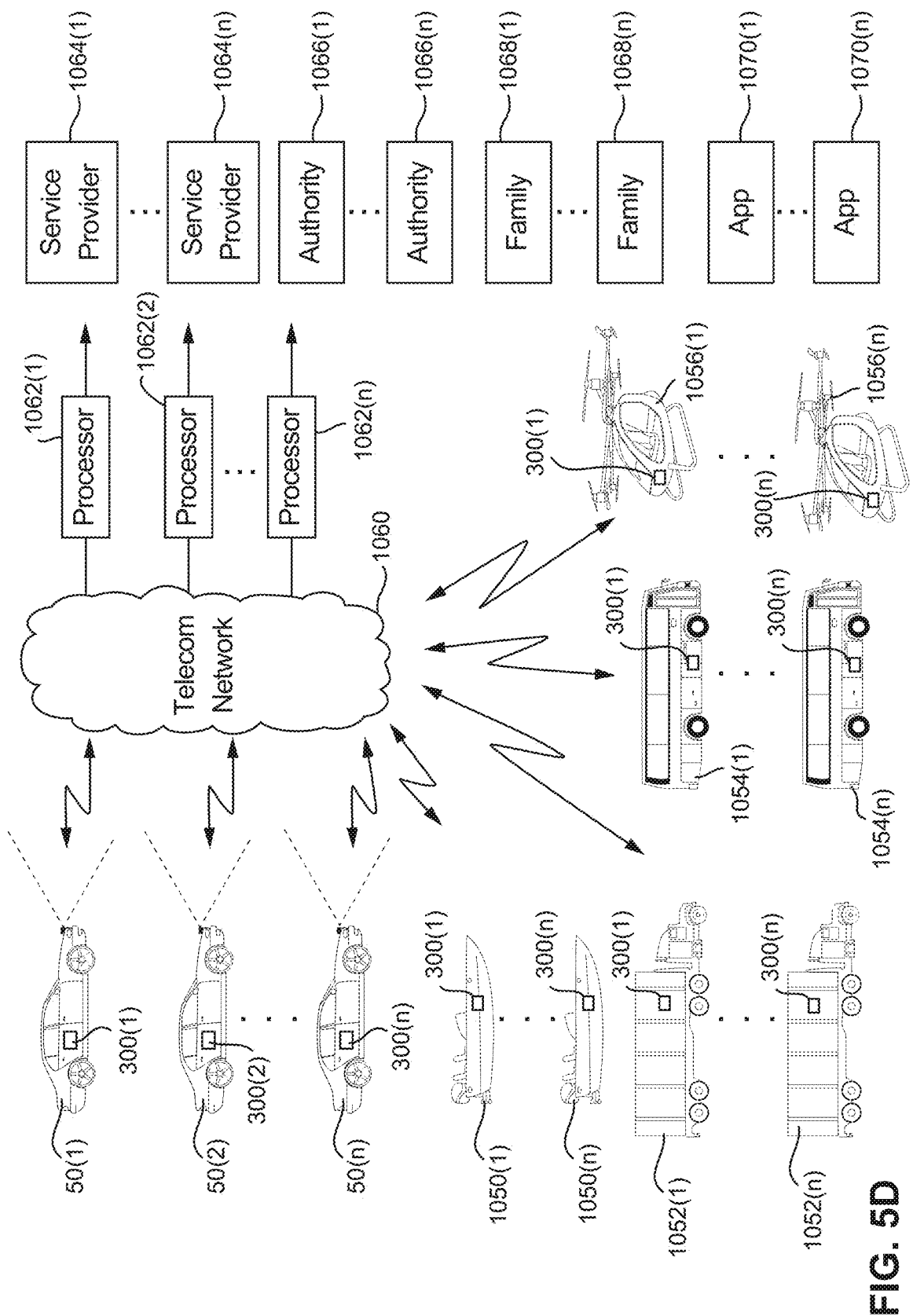
FIG. 5D shows an example non-limiting overall system diagram including plural vehicles, plural processing nodes and plural information recipients.

FIG. 5D shows an example overall system that includes many such vehicles each of which include the capabilities described above. For example, in the example shown, a plurality of cars 50, a plurality of boats 1050 or other watercraft, a plurality of trucks 1052, a plurality of busses 1054 and a plurality of personal flight vehicles 1056 are each monitored with a system of the type shown in FIGS. 4-5C. Any type of moving object including but not limited to any time of vehicle (manned or unmanned) may be so monitored. The various vehicles communicate via FIG. 4 block 190 the data as described in FIGS. 5A, 5B, 5C to one or more remote processors 1062 in the "cloud" via one or more telecommunications networks 1060 which may be based on cellular telephone, wifi, wimax, or any other suitable wireless networking or communication technology. The processors 1062 then selectively process the received data, filter the processing results, and provide the filtered processed results to different ones of service providers 1064 such as insurance companies, employers, fleet operators, vehicle maintenance companies, etc.; authorities such as courts, law enforcement agents, highway authorities, etc.; families 1066 such as parents of teen or adult children of elderly drivers; apps 1070 such as smart phone apps operated by the drivers themselves or other authorized participants; and others. Such communications in many embodiments will in all cases authorized to protect privacy. For example, no communication is made to law enforcement agencies or courts unless there is consent or a warrant has been issued.

Driver Skill/Behavior/Risk Determination

Once the FIG. 5D system correlates driver behaviors with accidents, one only needs to characterize an individual driver based on the characteristics—something that could be done in a short amount of driving time. Also, if drivers know what the characteristics they're being judged on are, and which are affecting their insurance rates, they could get real-time feedback on the car dashboard or on an app on their smart phones, if they wanted such, so that they could modify their behaviors to reduce their rate.

Drivers could be categorized on different scales—e.g., attentiveness, aggressiveness, distancing, and skillfulness—to name a few. Behaviors can be characterized in terms of relations to neighboring vehicles. Doing 80 mph on an empty highway may be illegal, but it may not particularly dangerous or risky if visibility is good, the road is dry and no other adverse considerations apply. Doing 80 mph on a well trafficked road where most others are going 65 mph can be exceedingly dangerous, even reckless. The difference is ego's behavior relative to neighbors rather than ego's own behavior.

Processors 1062 and/or 300 may, by executing instructions stored in non-transitory memory, determine, calculate or otherwise ascertain example driver behavior evaluation factors or characteristics including:

Attentiveness: Measure of driver attention to the road based on traffic circumstances. Main measures may include:

Driver focus as measured by dash cam(era) or other sensors

Ego distance to neighboring vehicles

Speed

Maneuver status (straight, turning, accelerating, stopping, etc.)

Neighbor status (no neighbors, neighbor in adjacent lane in blind spot, neighbor in opposing lane moving at a certain speed or greater, neighbor move orthogonally to ego (e.g. an intersection, etc.)

Correlations may include:

Driver focus correlated with distance, speed, maneuver status and neighbor status both individually and covariantly Aggressiveness Measure of driver maneuvering; Main measures may include:

Speed

Velocity

Acceleration

Relative speed

Relative velocity

Relative acceleration

Ego distance to neighboring vehicle(s) or other objects

Maneuver status

Neighbor status

Correlations may include:

Distance from neighbors vs. speed and relative speeds to neighbors

Distance from neighbors vs. acceleration and relative acceleration and/or speeds to neighbors Space between front/back neighbors during lane change and relative velocities (e.g. cutting neighbors off)

Number of distinct maneuvers over time correlated with number of neighbors per maneuver (e.g. weaving through traffic)

Distancing—built on assumption that you can't hit (or be hit by) something if nothing is nearby Measure of time ego spends in close proximity to neighbors. Main measures may include:

Speed

Ego distance to neighbors

Relative speeds of neighbors

Correlations may include:

Ego speed adjustments vs neighbor location and speed (is ego trying to maximize distance?)

Skillfulness—Measuring things known to take some skill. Main measures may include:

Ego distance to neighbors

Maneuver status

Distance between cars before parallel parking

Distance between cars before back in or front in parking

Correlations may include:
- Number of maneuvers taken to parallel park vs. distance between cars
- Speed of maneuvers (e.g. fluidity)
- Final distance from curb and neighbors
- Number of maneuvers taken in front/back in parking
- Speed of maneuvers
- Final distance from neighbors.

Example Sensor 182 Configuration

Figure 9:
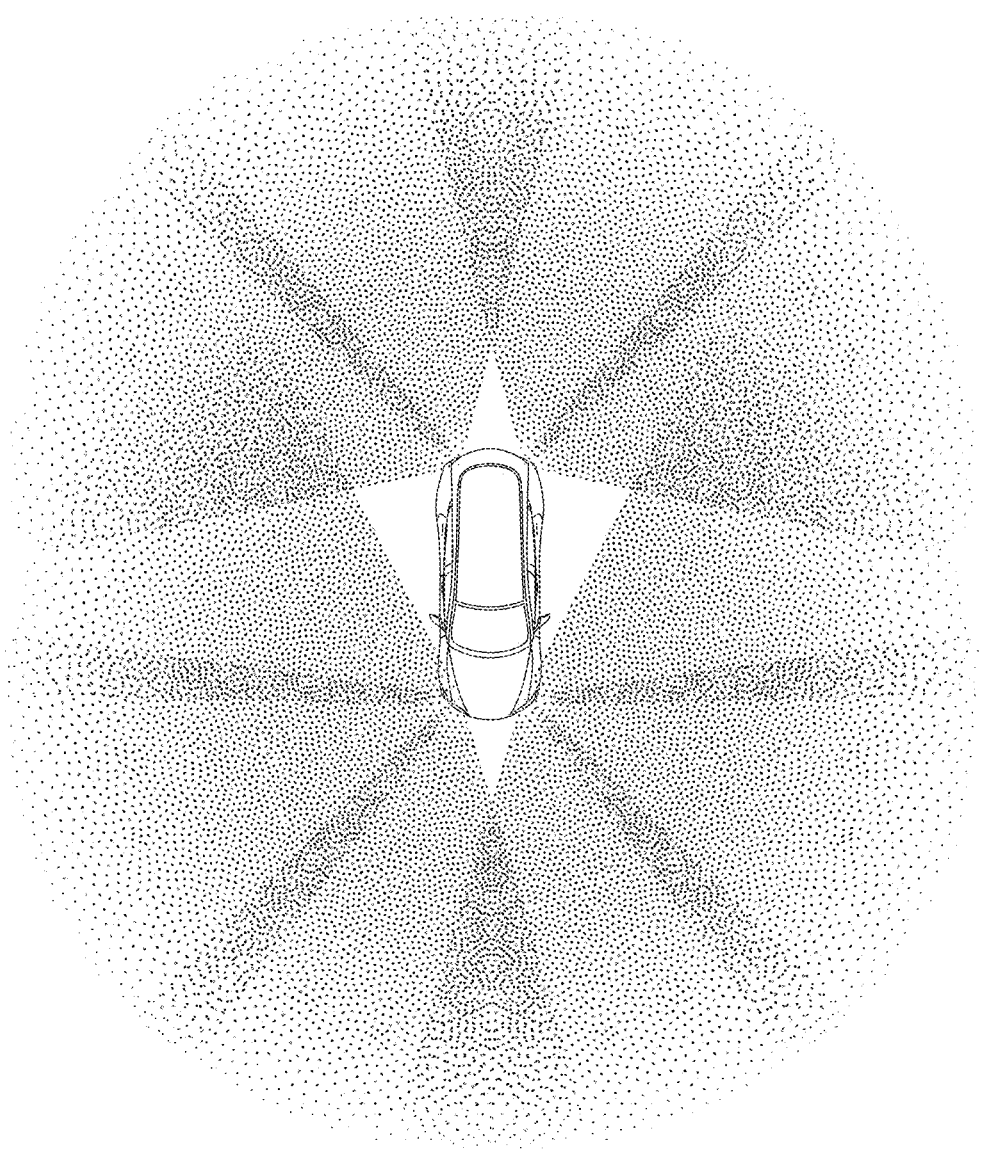
FIG. 9 shows an example non-limiting approach for attaining 360 degree surround sensor coverage.

As shown in FIG. 6, one example non-limiting embodiment takes a continuous wave (CW) TOF sensor that has been designed to sample at very high speed (up to 500 samples per second). The 101 imager and processor printed circuit board (PCB) is connected to the 105 emitters (in this particular case a linear array of 8 emitters) via a 103 flexible connector, typically via a gigabit Ethernet protocol. The power, external interconnects and auxiliary components are housed in 107. FIG. 2C is an exploded view of the FIG. 2B rear view mirror assembly providing a further multisensory configuration (integrated into the rear view mirror assembly as in FIG. 2B) where the printed circuit board 101 is connected by plural flexible connectors 103 (in this case three flexible connectors) to plural (in this case three) associated emitter arrays 105 each include a linear array of 6 emitters on an associated daughter board. In the particular embodiment shown, a camera C or other light/radiation sensor may also be included within the sensor arrays. The FIG. 2A/2B example arrangement thus provides three TOF sensor arrays 182 (one forward looking, one rearward looking, and one side looking) within a single projecting rear view mirror assembly. By providing such a rear view mirror assembly on each side of the car, a 6-sensor array system can be compactly provided in a way that is rugged, weatherproof and aesthetically pleasing while still providing a 360 degree coverage as shown in FIG. 9. The sensor technology herein is not limited to linear arrays; other embodiments use circular arrays of emitters as shown in FIG. 3 and other shaped array configurations (e.g., triangular) are also possible.

Figure 7:
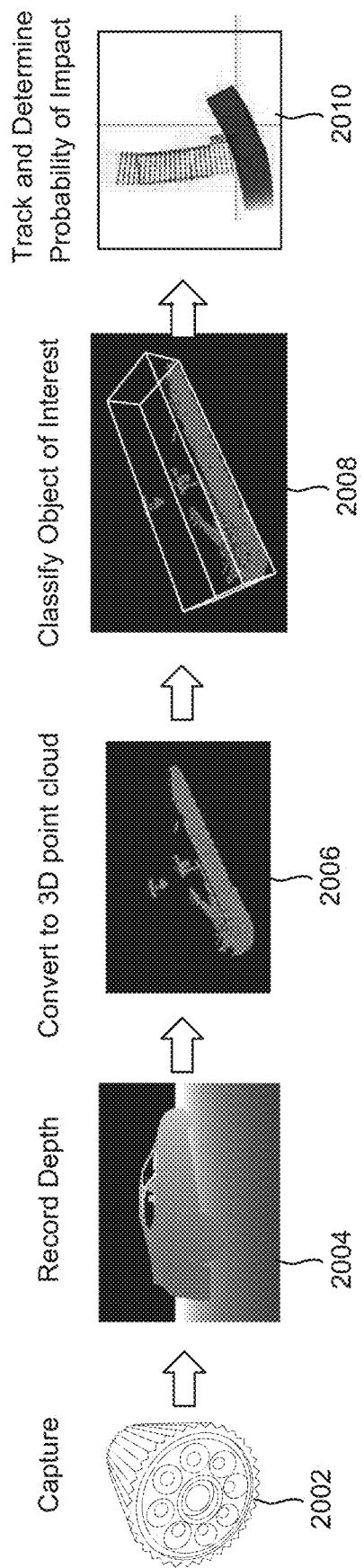
FIG. 7 shows an example of how an example non-limiting TOF sensor builds a point cloud that is then converted to an object, which is tracked and used to form a probability of impact.

The method that system would operate with is shown in FIG. 7. The sensor with on-board processing captures data 2002; that for a CWTOF sensor is output as a radial depth map 2004. This depth map 2004 is converted by the onboard software to a 3D point cloud 2006, which in turn, is classified into an object of interest 2008. The object is then tracked 2010. Tracking 2010 typically entails placing each subsequent object frame location into a Kalman filter or similar. From this, the track location, velocity vector and even accelerations can be output along with estimates of their error. These values are then run through a "probability engine" to create an estimate of collision probability and a "severity estimator" to estimate the severity of any collision, as described above.

Example Sensor/System Packaging and Form Factor

The system has been designed for ease of packaging onto existing and future vehicles.

FIGS. 8A, 8B show example non-limiting embodiments of packaging schemes that incorporates a CWTOF sensor 182 into the headlamps and tail lamps of a vehicle. FIG. 8A shows an arrangement including a forward-looking sensor 2101 integrated into a headlamp arrangement of a vehicle and a sideways-looking sensor 2102 integrated into a side portion of the same headlamp arrangement. In this particular non-limiting example, the round sensor 2101 to the left of 3 vertical pairs of emitters in a row is facing forward and the sidelooking sensor 2102 comprises a sideways looking sensor with an enclosed emitter panel. FIG. 8B meanwhile shows two sensors (a sideways looking sensor 2202 and a rearward-looking sensor 2201) integrated into a tail lamp. In this particular FIG. 8B example, sensor 2201 is a straightforward rearward-looking sensor with 3 emitters above and 3 emitter below and sensor 2202 is also in the tail lamp but looking sideways with a row of 6 emitters to the left and a single sensor to the right. When configured into the headlamps and tail lamps in this manner, the system can provide 360 degree protection as shown in FIG. 9. In particular, FIG. 9 shows a birds eye view of a vehicle with 8 sensors (two in each of left and right tail lights as shown in FIG. 8B and two in each of left and right headlamps as shown in FIG. 8A) to provide 360 degrees of sensing with a 90 degree horizontal field of view (FOV). These are only non-limiting examples.

The technology herein may be used in any context in which collisions may occur. For example, the sensor(s) may be mounted on a stationary object that is about to the struck by a moving object, or it/they may be mounted on a moving object that is about to strike an stationary object, or it/they may be mounted on a moving object that is about to strike or be struck by a moving object. A countermeasure may be deployed based on tracking information such as the direction of impact, the speed of impact, the force of impact, the time of impact, etc. The countermeasure can be deployed before impact, or it can be prepared for deployment and not employed until the moment of impact or even after the moment of impact. Multiple countermeasures can be deployed, e.g., some countermeasures can be deployed before impact and other countermeasures can be deployed at impact or after impact. Countermeasures can be employed in a "stair stepped" manner, based on severity of expected impact, direction of expected impact, expected force of impact, measured force of actual impact (once impact actually occurs), etc., as the system learns more information about the nature of the impact. Sensing and tracking may be performed continually—not just before impact.

All patents and publications cited herein are incorporated by reference as if expressly set forth.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

The invention claimed is:

1. A system for monitoring and reporting on driving behavior of a human driver of a vehicle, the system comprising:
   at least one sensor configured to be installed onboard the vehicle, the at least one sensor being further configured to sense a closing distance, speed and/or acceleration relative to at least one sensed object external to the vehicle;
   at least one processor and associated memory operatively coupled to the at least one sensor and connected to receive data relating to the sensed closing distance, speed and/or acceleration relative to the at least one sensed object, the processor and the associated memory being further configured to collect and store trajectory data based on the data relating to the sensed closing distance, speed and/or acceleration, the at least one processor being further configured to perform non-real-time behavioral analytics on said trajectory data to determine likelihood of the vehicle colliding with the at least one sensed object external to the vehicle that form a basis for an assessment of risky driving behavior of the human driver of the vehicle, including:
perturbing the stored trajectory data to generate a perturbed probability of collision and a perturbed time of collision,
assessing a risk of collision based on the perturbed probability of collision and the perturbed time of collision, and
characterizing the driving behavior of the human driver based on the assessed risk of collision; and
a communications device operatively connected to the at least one processor, the communications device being further configured to report the characterized driving behavior of the human driver.

2. The system according to claim 1, wherein:
the at least one sensor comprises at least one of a non-contact sensor or a time-of-flight sensor or a stereoscopic sensor or a short-range radar sensor or an imaging acoustic sensor.

3. The system according to claim 1, wherein:
the at least one sensor senses parameters relating to a range, a rate of closing and a direction of closing relative to the at least one sensed object.

4. The system according to claim 1, wherein:
the at least one sensor senses positional and/or motion information of the vehicle relative to the at least one sensed object, and
the at least one sensed object includes at least one of a moving object and a stationary object.

5. The system according to claim 1, wherein the at least one processor is further configured to track the at least one sensed object as the vehicle closes on the at least one sensed object and/or the at least one sensed object closes on the vehicle.

6. The system of claim 1, wherein:
the at least one processor is further configured to:
determine, based on the stored trajectory data, driving habits of the human driver that are likely to cause a collision or avoidance of collision with objects, and use a reporting device to report the determined driving habits.

7. A method comprising:
sensing, using at least one sensor onboard a vehicle driven by a human driver, a closing distance, speed and/or acceleration of the vehicle relative to at least one sensed object external to the vehicle;
collecting and storing trajectory data, using at least one processor and associated memory, in response to the sensing of the closing distance, speed and/or acceleration;
performing non-real-time behavioral analytics, using the at least one processor, indicating likelihood of the vehicle colliding with the at least one object external to the vehicle that form a basis for an assessment of risky driving behavior of the human driver of the vehicle, the non-real-time behavioral analytics including:
perturbing the stored trajectory data to generate a perturbed probability of collision and a perturbed time of collision,
assessing a risk of collision based on the perturbed probability of collision and a perturbed time of collision, and
characterizing driving behavior of the human driver based on the assessed risk of collision; and
reporting data relating to the characterized driving behavior.

8. The method of claim 7, wherein the sensing is performed continually while the vehicle is in operation.

9. The system of claim 1, wherein the at least one sensor and/or the at least one processor is configured to be integrated in a headlamp, a tail lamp, a rearview mirror housing, a pillar, B pillar, a front grill, a front bumper, a rear bumper or a trunk housing.

10. The system of claim 1, wherein:
the at least one processor is further configured to:
determine, based on the stored trajectory data, driver attentiveness, aggressiveness, distancing, and skillfulness in terms of relations to neighboring vehicles, and
distinguish between maneuvers in close proximity to other vehicles and maneuvers not in close proximity to other vehicles.

11. The system of claim 3, wherein the at least one sensor comprises a time-of-flight sensor, and the at least one processor is further configured to convert phase data from the time-of-flight sensor to point cloud data.

12. The system of claim 1, wherein the at least one sensor is disposed onboard the vehicle and the at least one processor includes a processor that is located remotely to the vehicle and is operatively connected to the vehicle via a communications link.

13. The system of claim 1, wherein the at least one processor is further configured to implement a collision probability engine and a collision severity engine that use kinematics of the vehicle and objects external to the vehicle to calculate likely physically possible outcomes based on potential physically realizable paths that pose potential threats of collision and severity of collision.

14. The system of claim 1, wherein the stored trajectory data indicates at least one near miss.

15. The method of claim 7, wherein the reported trajectory data indicates at least one near miss.

16. In a vehicle, a monitoring and reporting apparatus for monitoring and reporting on driving behavior of a human driver of the vehicle, the apparatus comprising:
at least one sensor configured to be installed on board the vehicle that senses closing distances, speeds and/or accelerations of the vehicle with objects external to the vehicle;
a processor configured to be installed on board the vehicle and operatively coupled to the at least one sensor, the processor being further configured to collect, in response to the sensing of the closing distances, speeds and/or accelerations, data indicating likelihood of the vehicle colliding with the objects external to the vehicle that form a basis for an assessment of risky driving behavior of the human driver of the vehicle; and
a communications device operatively connected to the processor, the communications device reporting the data indicating likelihood of the vehicle colliding with the objects external to the vehicle that form the basis for the assessment of risky driving behavior of the human driver,
wherein the data is configured to correlate driver focus with distance, speed, maneuver status and neighbor status, both individually and covariantly.

17. The method of claim 7, further including:
determining, using the at least one processor, statistically significant correlations between the characterized driving behavior of the human driver and accident data groups.

18. The method of claim 7, further including:
determining, using the at least one processor, whether driving behavior of the human driver relative to another vehicle(s) is risky even though no accident has been sensed.

19. The method of claim 7, further including:
evaluating, using the at least one processor, potential physically realizable trajectories that result in collision as to the potential severity of the threat the potential physically realizable trajectories pose should a collision occur.

20. The method of claim 7, wherein the at least one processor distinguishes, in the case of a near miss from a head-on collision, whether another vehicle maneuvered to a collision course with the vehicle or whether the vehicle maneuvered into a collision trajectory with another vehicle or other object.

21. The apparatus of claim 1, wherein the at least one sensor comprises a long-range sensor fused with a close-in sensor.

22. The apparatus of claim 1, wherein the at least one processor is further configured to:
determine a track of the at least one sensed object as the at least one sensed object closes,
output errors associated with the track, and
use the track and the errors associated with the track to determine a probability of collision.

23. The system of claim 1, wherein
the at least one processor comprises a first processor onboard the vehicle and a second processor remote to the vehicle, and
the second processor is configured to:
receive the stored trajectory data from the first processor;
perturb the received trajectory data to generate the perturbed probability of collision and the perturbed time of collision,
assess the risk of collision based on the perturbed probability of collision and the perturbed time of collision, and
characterize the driving behavior of the human driver based on the assessed risk of collision.

24. The system of claim 1, further comprising:
an advanced driver assistance system including a three-dimensional object view corrector and an object tracker;
a global positioning system receiver, and
a camera.

25. The system of claim 1, wherein
the at least one sensor comprises an inertial measuring device, and
the at least one processor is connected to the inertial measuring device and is further configured to:
determine a trajectory of the vehicle based on an input received from the inertial measuring device and to perturb the determined vehicle trajectory,
track the at least one sensed object based on data from the at least one sensor, and
determine the perturbed probability of collision and the perturbed time to collision with the tracked object based on the tracking of the at least one sensed object and the perturbed vehicle trajectory.

26. The method of claim 7, further comprising:
receiving, using the at least one processor, inertial sensing information,
determining, using the at least one processor, a trajectory of the vehicle based on the received inertial sensing information,
perturbing, using the at least one processor, the determined vehicle trajectory,
tracking, using the at least one processor, the at least one sensed object based on the closing distance, speed and/or acceleration of the vehicle relative to at least one sensed object external to the vehicle, and
determining, using the at least one processor, the perturbed probability of collision and the perturbed time to collision based on the tracking of the at least one sensed object and the perturbed vehicle trajectory.

* * * * *